(12) United States Patent
McGowan et al.

(10) Patent No.: US 8,767,851 B2
(45) Date of Patent: Jul. 1, 2014

(54) MULTI-CARRIER/TECHNOLOGY PEAK POWER REDUCTION

(75) Inventors: Neil McGowan, Stittsville (CA); Marthinus Willem Da Silveira, Ottawa (CA)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 0 days.

(21) Appl. No.: 13/478,526

(22) Filed: May 23, 2012

(65) Prior Publication Data

US 2013/0315320 A1 Nov. 28, 2013

(51) Int. Cl.
*H04K 1/10* (2006.01)
(52) U.S. Cl.
USPC ............ 375/260; 375/262; 375/265; 375/267
(58) Field of Classification Search
CPC .............. H04L 27/2647; H04L 5/0007; H04L 27/2657; H04L 27/2662; H04L 5/0048; H04L 27/02; H04L 5/023; H04L 27/3405; H04B 14/02; H03M 5/12
USPC .......... 375/260, 262, 265, 267; 370/203, 204, 370/205, 208, 209, 210
See application file for complete search history.

(56) References Cited

U.S. PATENT DOCUMENTS 7,292,639 B1 11/2007 Demirekler et al.
8,126,072 B2 * 2/2012 Namgoong et al. .......... 375/260
8,331,466 B2 * 12/2012 Guo et al. ..................... 375/260

FOREIGN PATENT DOCUMENTS

WO 2011/060509 A1 5/2011

OTHER PUBLICATIONS

Manjung Seo, "An iterative technique of Time- and Frequency-Domain Clipping for reducing PAPR of OFDM signals", IEEE 2007.*
International Search Report and the Written Opinion of the International Searching Authority issued in corresponding International Application No. PCT/IB2013/000979, date of mailing Oct. 8, 2013.

* cited by examiner

*Primary Examiner* — Dhaval Patel
(74) *Attorney, Agent, or Firm* — Potomac Patent Group PLLC

(57) ABSTRACT

Disclosed is a system and method for peak power reduction on a plurality of frequency domain orthogonal frequency divisional multiplexing (OFDM) signal carriers and a plurality of time domain signal carriers in a communications system. The system includes a plurality of frequency domain carrier processing blocks configured to iteratively perform frequency domain processing of at least one frequency domain OFDM signal carrier to reduce peak power transmission and a plurality of time domain carrier processing blocks configured to iteratively perform time domain processing of at least one time domain signal carrier to reduce peak power transmission, wherein the system is further configured to perform the frequency domain processing and time domain processing substantially simultaneously, thereby spreading excess peak power to one or more of the plurality of frequency domain OFDM signal carriers and to one or more of the plurality of time domain signal carriers.

30 Claims, 14 Drawing Sheets

MULTI-CARRIER/TECHNOLOGY PEAK POWER REDUCTION

TECHNICAL FIELD

The present invention relates generally to the transmission of multi-carrier and multi-technology carrier signals (e.g., Long Term Evolution orthogonal frequency division multiplexing (LTE OFDM) and wideband code division multiple access (WCDMA), among others), and more particularly to the power-efficient transmission of such carrier signals through a reduction in combined peak power using both the frequency domain and time domain of the respective different types of signals.

BACKGROUND

Complex radio signals can be used for digital audio communications, as is well known to those of ordinary skill in the art. For example, one common complex transmission scheme is orthogonal frequency-division multiplexing (OFDM), which can be used for terrestrial digital video broadcasting (DVB-T), digital audio broadcasting (DAB-T), wireless local area networks, and wireless metropolitan area networks. However, the well-known advantages of OFDM are somewhat counter-balanced by a significant side-effect: high peak-to-average power ratio. High peak-to-average power ratios of OFDM significantly reduces the average power at the output of the high-power amplifier (HPA) used at the transmitter. Relatively expensive HPA's are required because, as is true of many power amplifiers, the input signal must lie within the linear range of the power amplifier, and because there is an increased linear dynamic range, the power amplifiers require expensive components and more complicated designs to provide such dynamic range. Some solutions to this problem include digital reduction of the peak-to-average power ratios.

Digital reduction of the peak-to-average power ratio (PAPR) of a complex radio signal, while filtering the signal to remove out of band emissions, provides a way to reduce the peak demand on a power amplifier. Digital reduction of the PAPR of a complex radio signal enables improved efficiency and reduces the cost of a cellular radio system with a small, but acceptable degradation in signal quality or error vector magnitude (EVM). From here-on in, throughout this discussion, the term "peak power reduction" (PPR) shall be used in place of PAPR for convenience.

Orthogonal frequency division multiplexing (OFDM) technologies have complex radio signals with many closely spaced sub-carriers, each of which can have a very different EVM requirement. However, the close frequency spacing increases the difficulty in providing differentiation from an EVM perspective while reducing the PAPR. Existing technologies do not efficiently differentiate between sub-carriers and the required reserved sub-carriers. In addition, there are existing time domain based technologies, such as wideband code division multiplexing multiple access (WCDMA), code division multiple access (CDMA), global system for mobile communications (GSM) and others, that often continue to be used in the same band and sharing the same transmitter where OFDM signals are being used. Thus, the peak power reduction problem becomes even more pronounced and difficult to solve. In OFDM, it is known that there can be, for example up to 600 in-band sub-carriers and up to 424 guard band sub-carriers, for a total of 1024 "sub-carriers" in each band, or "carrier". As those of ordinary skill in the art understand, each sub-carrier in an OFDM communications system is an integer multiple of a base sub-carrier frequency, which is what makes each sub-carrier orthogonal to each other, and hence non-interfering. Accordingly, OFDM communications systems have been implemented wherein the sub-carrier frequency spacing is about 15 KHz.

With the use of OFDM technologies, the signal is composed of an array of sub-carriers of varying tolerance to degradation in signal quality. That is, different sub-carriers have different EVM requirements. Some of the existing time domain solutions are unable to make a distinction between the sub-carriers, and so time domain solutions are limited in the amount of PPR that can be applied to the least tolerant sub-carrier (of an OFDM signal). In other cases, the existing solutions do not differentiate between traffic sub-carriers and required reserved tones (or reserved sub-carriers) that take away from the allocated spectrum for normal communication (See, for example, "Apparatuses and a Method for Reducing Peak Power in a Transmitter of Telecommunications Systems", U.S. Published Patent Application No. 2009/0176466 A1, published on Jul. 9, 2009, by Richard Hellberg, and Torbjorn Widhe, the entire contents of which are incorporated herein by reference; and "System and Method for Reducing Peak-to-Average Power Ratio in Orthogonal Frequency Division Multiplexing Signals Using Reserved Spectrum", U.S. Pat. No. 7,583,583, Issued Sep. 1, 2009, to Ning Guo, Neil McGowan, and Gary Boudreau, the entire contents of which are incorporated herein by reference). Other existing solutions differentiate between traffic sub-carriers, but still require reserved sub-carriers that take away from the allocated spectrum for normal communication (See, for example, "Method and System for Adaptive Peak-To-Average Power Ratio Reduction in Orthogonal Frequency Division Multiplexing Communication Networks", U.S. Published Patent Application No. 2009/0092195 A1, published on Apr. 9, 2009, by Ning Guo, Neil McGowan, and Bradley John Morris, the entire contents of which are incorporated herein by reference). Furthermore, all of these prior methods produce and pass between iterations a time domain representation of the signal. This is problematic for at least two reasons: first, there can be problems differentiating between sub-carriers; and second, a conversion must take place. When OFDM and time domain technologies are used sharing the same band and transmitter, then existing PPR systems and methods use a time domain based system that have all of the above limitations.

Consequently, because of the problems associated with performing PPR for both OFDM and time domain signals through time domain solutions alone, as briefly discussed above, it would be desirable to provide methods, modes, and systems for performing peak power reductions using other than just the time domain solutions previously proscribed that will obviate or minimize the problems associated with prior art solutions. Performing PPR in the frequency domain together with a phase slope provides the use of low-sample rates for multiple carriers in the frequency domain and use of guard bands for PPR.

SUMMARY

It is therefore a general aspect of the invention to provide a combined frequency and time domain peak-to-average power reduction transmission system that will obviate or minimize problems of the type previously described.

According to a first aspect of the present invention, a system for peak power reduction on a plurality of frequency domain orthogonal frequency divisional multiplexing (OFDM) signal carriers and a plurality of time domain signal carriers in a communications system is provided comprising a plurality of frequency domain carrier processing blocks (20) configured to iteratively perform frequency domain processing of at least one frequency domain OFDM signal carrier to reduce peak power transmission, and a plurality of time domain carrier processing blocks (48) configured to iteratively perform time domain processing of at least one time domain signal carrier to reduce peak power transmission, wherein the system is further configured to perform the frequency domain processing and time domain processing substantially simultaneously, thereby spreading excess peak power to one or more of the plurality of frequency domain OFDM signal carriers and to one or more of the plurality of time domain signal carriers.

According to the first aspect, the at least one OFDM signal carrier includes both in-band sub-carrier signals, and guard-band sub-carrier signals, and the system is further configured to generate a joint error signal based on a substantial simultaneous processing of the at least one frequency domain OFDM signal carrier and at least one time domain signal carrier.

According to the first aspect, the joint error signal is further applied substantially synchronously to each of the frequency domain and time domain carrier processing blocks on an iterative basis, and wherein the joint error signal, upon application to the frequency domain and time domain carrier processing blocks, has applied to it a respective plurality of frequency dependent weights to reduce peak power transmissions.

According to the first aspect, the system further comprises a plurality of frequency domain iteration processing blocks (8), wherein each of the plurality of the frequency domain carrier processing blocks includes at least one of the plurality of frequency domain iteration processing blocks, and wherein a first frequency domain iteration processing block (8) is configured to receive a respective one of the plurality of frequency domain OFDM signal carriers, and generate a first time domain OFDM error path processing block frequency shifted signal ($C_{nmF}$), receive a first iterative time domain un-weighted error signal ($E_n$), and output a first iterative frequency domain peak power reduced OFDM carrier signal ($S_{nmF}$), and wherein each of the remaining N−1 frequency domain iteration processing blocks (8) are configured to receive an $(n-1)^{th}$ iterative frequency domain peak power reduced OFDM carrier signal carrier, output an $n^{th}$ time domain OFDM error path processing block frequency shifted signal, receive an $n^{th}$ iterative un-weighted error signal, and generate an $n^{th}$ iterative frequency domain peak power reduced OFDM signal carrier, and a plurality of time domain iteration processing blocks (50), wherein each of the plurality of the time domain carrier processing blocks includes at least one of the plurality of time domain iteration processing blocks, and wherein a first time domain iteration processing block (50) is configured to receive a respective one of the plurality of time domain signal carriers, and generate a first time domain error path processing block frequency shifted signal ($C_{nmT}$), receive the first iterative time domain un-weighted error signal ($E_n$), and output a first iterative time domain peak power reduced signal carrier ($S_{nmT}$), and wherein each of the remaining N−1 time domain iteration processing blocks (50) are configured to receive an $(n-1)^{th}$ iterative time domain peak power reduced signal carrier, output an $n^{th}$ time domain error path processing block frequency shifted signal, receive an $n^{th}$ iterative un-weighted error signal, and generate an $n^{th}$ iterative time domain peak power reduced signal carrier.

Still further according to the first aspect, the system further comprises a plurality of frequency domain OFDM signal processing blocks, there being a respective one of the plurality of frequency domain OFDM signal processing blocks for each of the respective plurality of frequency domain carrier processing blocks, and wherein each of the plurality of frequency domain OFDM signal processing blocks is configured to receive an $n^{th}$ iterative frequency domain peak power reduced OFDM signal carrier and output a time domain, filtered, peak power reduced OFDM signal carrier, a time domain peak power reduced block configured to receive the plurality of time domain, filtered, peak power reduced OFDM signal carriers and the plurality of time domain peak power reduced signal carriers, further process all of the received signals, and output a combined peak power reduced signal carrier, and a high powered transmitter to transmit the combined peak power reduced signal carrier following conversion from a digital time domain signal to an analog signal.

According to the first aspect, each of the plurality of OFDM signal processing blocks comprises an equalizer (10) configured to boost in amplitude sub-carrier guard band signals within the $n^{th}$ iterative frequency domain peak power reduced input signal, an inverse Fast Fourier Transform circuit (12) configured to convert the equalized $n^{th}$ iterative frequency domain peak power reduced input signal to an equalized $n^{th}$ iterative time domain peak power reduced input signal, and a filter (14) configured to substantially reduce or eliminate unwanted frequency components from the equalized $n^{th}$ iterative time domain peak power reduced input signal to output time domain, filtered, peak power reduced OFDM signals Still further according to the first aspect, each of the plurality of frequency domain carrier processing blocks (20) comprises a plurality of frequency domain error path processing blocks (4), and wherein each of the plurality of frequency domain error path processing blocks include a phase slope circuit (24) configured to add a determinable phase slope to the received frequency domain OFDM signal carrier in the frequency domain, an inverse Fast Fourier Transform circuit (26) configured to convert the phase shifted frequency domain OFDM signal carrier to the time domain, wherein due to the added determinable phase slope, a plurality of sampling points will be shifted by a first fractional time amount, a cyclic prefix adder (40) for adding a first predetermined prefix to a first symbol of the frequency domain OFDM signal carrier, and a first numerically controlled oscillator (28) configured to shift the time domain version of the frequency domain OFDM signal carrier by a first predetermined frequency amount, and outputting an iterative time domain OFDM error path processing block frequency shifted signal.

According to the first aspect, for each iteration of processing, the fractional time amount shift causes additional peak values of the iterative time domain OFDM error path processing block frequency shifted signal to be output by the frequency domain error path processing block.

In accordance with the first aspect, the system further comprises a rate change increase circuit (38) after the cyclic prefix adder circuit (40) and before first numerically controlled oscillator (28), wherein the rate change increase circuit includes a pre-determined rate change value R and is configured to generate M time domain sampling points, wherein M equals R times K, wherein K corresponds to the number of sample points of the time domain received frequency domain OFDM signal carrier.

According to the first aspect, each of the plurality of time domain carrier processing blocks (48) comprises a plurality of time domain error path processing blocks (52), and wherein each of the plurality of time domain error path processing blocks include a rate change increase circuit (38)

configured to increase the number of samples of the received time domain signal carrier by a factor R, a fractional delay interpolator circuit (54) configured to shift each of a plurality of sampling points of the received time domain signal carrier by a first time amount, wherein the first time amount is related to the iteration of processing within the time domain carrier processing block, and a second numerically controlled oscillator (28) configured to shift the time domain signal carrier by a second predetermined frequency amount (+$f_m$), and outputting an iterative time domain error path processing block frequency shifted signal.

Still further according to the first aspect, wherein for each iteration of processing, the time amount shift causes additional peak values of the iterative time domain error path processing block frequency shifted signal to be output by the time domain error path processing block.

According to the first aspect, the system further comprises a combiner (44) configured to combine a plurality of $n^{th}$ iterative time domain OFDM error path processing block frequency shifted signals and a plurality of $n^{th}$ iterative time domain error path processing block frequency shifted signals to generate an $n^{th}$ iterative total combined signal $C_{tot}$ and a clip error circuit (46) configured to compare the $n^{th}$ iterative total combined signal to a peak power threshold $T_{PPR}$ and generate an $n^{th}$ iterative un-weighted error signal $E_n$ on a symbol-by-symbol basis, wherein the $n^{th}$ iterative un-weighted error signal either has a zero value when the $n^{th}$ iterative total combined signal is less than the peak power threshold signal, and further wherein the $n^{th}$ iterative un-weighted error signal has a non-zero value when the $n^{th}$ iterative total combined signal is greater than the peak power threshold signal.

According to the first aspect, the non-zero value of the $n^{th}$ iterative un-weighted error signal is equal to the amount that the $n^{th}$ iterative total combined signal exceeds the peak power threshold signal, and further wherein the $n^{th}$ iterative un-weighted error signal is determined according to the equation of:

$$E_n = \left[1 - \frac{\sqrt{T_{PPR}(n)}}{|C_{tot}|}\right] C_{tot}.$$

According to the first aspect, the clip error circuit is further configured to, on an iterative basis, compare the $n^{th}$ iterative total combined signal to a first peak threshold amount at a respective one of each of the plurality of shifted sampling points to generate the $n^{th}$ iterative un-weighted error signal.

According to the first aspect, the system further comprises a select error vector magnitude portion circuit (60) configured to delete a prefix portion of the $n^{th}$ iterative un-weighted error signal that is omitted from error vector magnitude calculations in transmitted signal carriers in the communications system.

According to the first aspect the frequency domain error path processing block (4) further comprises a third numerically controlled oscillator (30) configured to receive the $n^{th}$ iterative un-weighted error signal and shift it by a third predetermined frequency amount substantially equivalent to an inverse of the first predetermined frequency amount, a symbol wrap-add circuit (42) configured to copy a prefix portion of the frequency shifted $n^{th}$ iterative un-weighted error signal and add the prefix portion to an end portion of the frequency shifted $n^{th}$ iterative un-weighted error signal, a Fast Fourier Transform circuit (32) configured to convert the frequency shifted $n^{th}$ un-weighted iterative error signal to a frequency domain iterative un-weighted error signal, a multiplier circuit (34) configured to multiply the frequency domain iterative un-weighted error signal by a plurality of weighting factors to generate a frequency domain iterative weighted error signal, an inverse phase slope circuit (36) configured to subtract a second determinable phase slope substantially equal to in magnitude to the first determinable phase slope from the iterative weighted error signal, and wherein the time domain error path processing block (52) further comprises a fourth numerically controlled oscillator (30) configured to receive the $n^{th}$ iterative un-weighted error signal and shift it by a fourth predetermined frequency amount substantially equivalent to an inverse of the second predetermined frequency amount, a filter configured to filter unwanted frequency components from the $n^{th}$ iterative un-weighted error signal, a multiplier circuit (34) configured to multiply the $n^{th}$ iterative un-weighted error signal by a plurality of weighting factors to generate an iterative weighted error signal, and an inverse fractional delay circuit configured to inversely shift each of a plurality of sampling points of the received iterative weighted error signal by a second time amount, wherein the second time amount is substantially equal to the first shift time amount.

According to the first aspect, the system further comprises a first plurality of delay circuits, one for each of the plurality of frequency domain carrier processing blocks, configured to receive a respective one of the plurality of frequency domain OFDM signal carriers and delay it by a first delta time, a first plurality of multiplier circuits, one for each of the plurality of frequency domain carrier processing blocks, configured to multiply the delayed frequency domain OFDM signal carrier and the weighted iterative error signal to generate the $n^{th}$ iterative frequency domain peak power reduced OFDM signal carrier, whereby excess peak power can be distributed to one or more guard-band sub-carriers of the OFDM signal carrier, and/or one or more in-band sub-carriers of the OFDM signal carrier, a second plurality of delay circuits, one for each of the plurality of time domain carrier processing blocks, configured to receive a respective one of the plurality of time domain signal carriers and delay it by a second delta time, a second plurality of multiplier circuits, one for each of the plurality of time domain carrier processing blocks, configured to multiply the delayed time domain signal carrier and the weighted iterative error signal to generate the $n^{th}$ iterative time domain peak power reduced signal carrier, whereby excess peak power can be distributed to one or more of the time domain signal carriers.

According to the first aspect, the first delta time is substantially equivalent to a sum of the processing time in phase slope increase circuit (24), inverse Fast Fourier Transform circuit (26), cyclic prefix added circuit (40), second numerically controlled oscillator (28), combiner (44), clip error circuit (46), select error vector magnitude portion circuit (60), third numerically controlled oscillator (30), symbol wrap added circuit (42), Fast Fourier Transform circuit (32), multiplier (34), and negative phase slope circuit (36), and further wherein the second delta time is substantially equivalent to a sum of the processing time in the positive rate change circuit (38), fractional delay circuit (54), second numerically controlled oscillator (28), combiner (44), clip error circuit (46), select error vector magnitude portion circuit (60), fourth numerically controlled oscillator (30), filter (56), and multiplier (34).

Still further according to the first aspect, the $n^{th}$ iterative frequency domain peak power reduced OFDM carrier is input to an $(n+1)^{th}$ frequency domain error path processing block, and an $n=(n+1)^{th}$ iterative frequency domain peak power reduction OFDM signal carrier is generated, and further wherein the $n^{th}$ iterative time domain peak power reduced signal carrier is input to an $(n+1)^{th}$ time domain error path processing block, and an $n=(n+1)^{th}$ iterative time domain peak power reduction signal carrier is generated.

According to the first aspect, the weighting factor is determined according to the equation of:

$$Wi = W_i = \frac{\sigma B_T w_i}{\sum_{i=0}^{K-1} B_{w_i}}$$

where $B_T$ is the total bandwidth; $B_{w_i}$ is the spectral density of each weight component $w_i$.

$w_i$ is a weight value that controls the amount of clipped energy that will fall on the frequency component i, K is the size of a Fast Fourier Transform (FFT) process, and $\sigma$ is a re-growth factor, wherein the re-growth factor controls the overall distortion of the received error signal and is a function of the number of iterations.

According to the first aspect, the weighting factor is determined according to a tolerance for distortion for each frequency domain OFDM signal carrier and each time domain signal carrier.

Still further according to the first aspect, the tolerance for distortion is characterized by an error vector magnitude for each frequency domain OFDM signal carrier and each time domain signal carrier, and wherein the number of iteration stages is dependent upon the frequency band of the carrier processing block and the amount of determinable phase slope that is added in each subsequent first error path processing step.

According to a second aspect of the present invention, a method for peak power reduction on a plurality of frequency domain orthogonal frequency divisional multiplexing (OFDM) carrier signals and a plurality of time domain carrier signals in a communications system is provided comprising iteratively performing, substantially simultaneously, a frequency domain modification of each of the plurality of frequency domain OFDM carrier signals to reduce peak power transmissions, and a time domain modification of each of the plurality of time domain carrier signals to reduce peak power transmissions, thereby spreading excess peak power to one or more of the plurality of frequency domain OFDM carrier signals and to one or more of the plurality of time domain carrier signals. Still further, the at least one OFDM signal carrier includes both in-band sub-carrier signals, and guard-band sub-carrier signals.

According to the second aspect, the method further comprises generating a joint error signal based on a substantial simultaneous processing of the at least one frequency domain OFDM signal carrier and at least one time domain signal carrier, and wherein the joint error signal is further applied substantially synchronously to each of a frequency domain carrier processing block and a time domain carrier processing block on an iterative basis, and wherein the joint error signal, upon application to the frequency domain and time domain carrier processing blocks, has applied to it a respective plurality of frequency dependent weights to reduce peak power transmissions.

According to the second aspect, the step of iteratively performing peak power reduction for both frequency domain OFDM carrier signals and time domain carrier signals comprises (a) receiving the plurality of frequency domain OFDM carrier signals in a $n^{th}$ frequency domain error processing block in a respective one of a plurality of frequency domain carrier processing blocks, (b) generating a frequency domain OFDM frequency shifted signal for each of the plurality of frequency domain OFDM carrier signals, (c) receiving the plurality of time domain carrier signals in a $n^{th}$ time domain error processing block in a respective one of a plurality of time domain carrier processing blocks, (d) generating a time domain frequency shifted signal for each of the plurality of time domain carrier signals, (e) summing all of the frequency domain frequency shifted signals and all of the time domain frequency shifted signals into a total power signal, (f) generating an un-weighted error signal representative of excess peak power ($E_n$), wherein the un-weighted error signal is proportional to an amount that the total power signal exceeds a peak power threshold amount, (g) applying a frequency dependent weighting factor ($W_i$) to the error signal to generate a frequency dependent weighted error signal, (h) subtracting the frequency dependent weighted error signal from each of the plurality of frequency domain OFDM carrier signals and time domain carrier signals, to reduce peak power in selected one or more of the OFDM carrier signals and selected one or more of the time domain carrier signals, and to increase peak power in selected one or more of the OFDM carrier signals and selected one or more of the time domain carrier signals, and (i) repeating steps (a) through (h) until N iterative stages have been performed to produce a plurality of $N^{th}$ iterative frequency domain OFDM carrier signals with excess peak power spread among a plurality of data carrying sub-carrier OFDM signals and guard band sub-carriers of the plurality of $N^{th}$ iterative frequency domain OFDM carrier signals to reduce peak power, and to further produce a plurality of $N^{th}$ iterative time domain carrier signals with excess peak power spread among the plurality of $N^{th}$ iterative time domain carrier signals to reduce peak power.

In accordance with the second aspect, the step of iteratively performing peak power reduction for both frequency domain OFDM carrier signals and time domain carrier signals comprises providing respective first frequency shifts for each of the plurality of frequency domain OFDM carrier signals ($C_{nmF}$), providing respective second frequency shifts of time domain carrier signals ($C_{nmT}$), summing all of the respective first and second frequency shifted signals to create a summed signal ($C_{tot}$), comparing the per sample magnitude of summed signal ($C_{tot}$) to a peak power threshold amount ($T_{PPR}$), generating an un-weighted error signal ($E_n$) if the per sample magnitude of the summed signal exceeds the peak power threshold amount, weighting the error signal by a frequency dependent weighting factor $W_i$ to generate a first frequency dependent weighted error signal and a second frequency dependent weighted error signal, and summing the first frequency dependent weighted error signal and each of the frequency domain OFDM carrier signals to generate an $n^{th}$ iterative frequency domain OFDM carrier signal, and summing the second frequency dependent weighted error signal and each of the time domain carrier signals to generate an $n^{th}$ iterative time domain carrier signal, such that excess peak power is spread about one or more of the frequency domain OFDM carrier signals and among one or more of the time domain carrier signals.

According to the second aspect, the frequency dependent weighting factor is determined according to the equation of:

$$W_i = \frac{\sigma B_T w_i}{\sum_{i=0}^{K-1} B_{w_i}}$$

where $B_T$ is the total bandwidth; $B_{w_i}$ is the spectral density of each weight component $w_i$.

$w_i$ is a weight value that controls the amount of excess peak power that will fall on the frequency component i, K is the size of a Fast Fourier Transform (FFT) process, and $\sigma$ is a re-growth factor, wherein the re-growth factor controls the overall distortion of the received first and second frequency dependent error signals, and is a function of the number N of iterations.

Still further according to the second aspect, the frequency dependent weighting factor is determined according to a tolerance for distortion for each sub-carrier signal of the frequency domain OFDM carrier signals and a tolerance for distortion for each time domain carrier signal, and wherein the tolerance for distortion is characterized by an error vector magnitude for each sub-carrier signal of the frequency domain OFDM carrier signals and a tolerance for distortion for each time domain carrier signal.

According to the second aspect, the un-weighted error signal is determined according to the equation of:

$$E_n = \left[1 - \frac{\sqrt{T_{PPR}(n)}}{|C_{tot}|}\right] C_{tot}.$$

In accordance with the second aspect, the step of providing respective first frequency shifts for each of the plurality of frequency domain OFDM carrier signals comprises receiving each of the plurality of frequency domain OFDM carrier signals in a separate one of a plurality of frequency domain carrier processing blocks (20), performing a first error path processing step in each of the separate frequency domain carrier processing blocks, wherein a determinable phase slope is added (24) to the received input OFDM carrier signal in the frequency domain, converting the phase shifted frequency domain OFDM carrier signal to the time domain (26), thereby shifting each of a plurality of sampling points by a first time amount, wherein the first time amount is related to the determinable phase amount that is related to the iteration of processing within the frequency domain carrier processing block, adding a cyclic prefix to each of the received plurality of frequency domain OFDM carrier signals, and frequency shifting each of the plurality of received frequency domain OFDM carrier signals by a predetermined frequency amount $(+f_m)$.

Still further according to the second aspect, the method further comprises performing a rate change to the time domain version of the frequency domain OFDM carrier signal following the addition of the cyclic prefix, and wherein the number of iteration stages is dependent upon the frequency band of the carrier processing block and the amount of determinable phase slope that is added in each subsequent first error path processing step.

According to the second aspect, the step of providing a plurality of second frequency shifts of time domain carrier signals comprises receiving each of the plurality of time domain carrier signals in a separate one of a plurality of time domain carrier processing blocks (48), performing a first error path processing step in each of the separate time domain carrier processing blocks, wherein a rate change increase is performed (38) to the received input time domain signal, adding a predetermined fractional delay (54), thereby shifting each of a plurality of sampling points by a first time amount, wherein the first time amount is related to the iteration of processing within the time domain carrier processing block, and frequency shifting each of the plurality of received time domain carrier signals by a predetermined frequency amount $(+f_m)$.

According to the second aspect, the step of generating an un-weighted error signal if the magnitude of the summed signal exceeds the peak power threshold amount comprises selecting a portion of the un-weighted error signal that corresponds to an error vector magnitude determination portion to be the un-weighted error signal, and the step of weighting the error signal to generate a frequency dependent weighted error signal comprises receiving the un-weighted error signal in the frequency domain carrier processing block and frequency shifting the un-weighted error signal by a second predetermined frequency amount $(-f_m)$, performing a symbol wrap and add to the frequency shifted un-weighted error signal in order to preserve orthogonality within frequency domain OFDM signals, converting the time domain frequency shifted un-weighted error signal to the frequency domain, multiplying the frequency domain un-weighted error signal by the frequency dependent weighting factor $W_i$ to generate the frequency dependent weighted error signal, and subtracting the determinable phase amount from the frequency dependent weighted error signal to be in phase alignment with the received frequency domain OFDM signal.

According to the second aspect, the step of weighting the error signal to generate a frequency dependent weighted error signal comprises receiving the un-weighted error signal in the time domain carrier processing block and frequency shifting the un-weighted error signal by a second predetermined frequency amount $(-f_m)$, filtering the frequency shifted un-weighted error signal to substantially eliminate or reduce unwanted frequency components, multiplying the filtered un-weighted error signal by the frequency dependent weighting factor $W_i$ to generate the frequency dependent weighted error signal, and subtracting the predetermined fractional delay (58) from the frequency dependent weighted error signal, thereby shifting each of a plurality of sampling points by the first time amount to be in time alignment with the received time domain carrier signals, and wherein the first time amount is related to the iteration of processing within the time domain carrier processing block.

According to the second aspect, the step of summing the first frequency dependent weighted error signal and each of the frequency domain OFDM carrier signals to generate an $n^{th}$ iterative frequency domain OFDM carrier signal comprises delaying the received frequency domain OFDM carrier signals by a first time period substantially equivalent to a time of processing to generate the first frequency dependent weighted error signal, and adding the first frequency dependent weighted error signal to the delayed frequency domain OFDM carrier signal to generate the $n^{th}$ iterative frequency domain OFDM carrier signal.

In accordance with the second aspect, the method further comprises receiving as an input, the $(n-1)^{th}$ iterative frequency domain OFDM carrier signal as an input to an $n^{th}$ iterative stage of performing peak power reduction for frequency domain OFDM carrier signals, and repeating the steps of generating the $n^{th}$ iterative frequency domain OFDM signal until n equal to N stages have been iteratively performed, and a $N^{th}$ iterative frequency domain OFDM carrier signal has been generated.

According to the second aspect, the method further comprises receiving the $N^{th}$ iterative frequency domain OFDM carrier signal in an equalizer, amplifying a portion of the $N^{th}$ iterative frequency domain OFDM carrier signal that pertains to a plurality of sub-carrier guard band signals to overcome attenuation of the sub-carrier guard band signals in additional signal processing, converting the $N^{th}$ iterative frequency domain OFDM carrier signal to a time domain signal, filtering the time domain $N^{th}$ iterative frequency domain OFDM carrier signal to substantially eliminate unwanted frequency signals, performing additional processing in a time domain peak power reduction processing block to substantially reduce the peaks in the symbol transition region, converting the output of the time domain peak power reduction processing block into an analog transmission signal, and transmitting a power amplified version of the transmission signal.

According to the second aspect, the step of summing the second frequency dependent weighted error signal and each of the time domain carrier signals to generate an $n^{th}$ iterative time domain carrier signal comprises delaying the received time domain carrier signal by a first time period substantially equivalent to a time of processing to generate the second frequency dependent weighted error signal, and adding the second frequency dependent weighted error signal to the delayed time domain carrier signal to generate the $n^{th}$ iterative time domain carrier signal.

In accordance with the second aspect, the method further comprises receiving as an input, the $(n-1)^{th}$ iterative time domain carrier signal as an input to an $n^{th}$ iterative stage of performing peak power reduction for time domain carrier signals, and repeating the steps of generating the $n^{th}$ iterative time domain carrier signal until n equal to N stages have been iteratively performed, and a $N^{th}$ iterative time domain carrier signal has been generated. Still further, the method further comprises receiving the $N^{th}$ iterative time domain carrier signal in a time domain peak power reduction processing block, performing additional processing in the time domain peak power reduction processing block to substantially reduce the peaks in the symbol transition region, converting the output of the time domain peak power reduction processing block into an analog transmission signal, and transmitting a power amplified version of the transmission signal.

According to the second aspect, the plurality of frequency domain OFDM signals includes both sub-carrier signals, and guard band signals, and wherein the plurality of time domain based signals includes wideband code division multiplexing multiple access (WCDMA) signals, code division multiple access (CDMA) signals, and global system for mobile communications (GSM) signals.

In accordance with the second aspect, the step of iteratively performing the frequency domain modification comprises receiving in each new iterative step a frequency domain representation of the output signal from a previous iterative step, and wherein each output signal from each iterative step is determined by subtracting an error signal determined for each iterative step, and wherein the error signal when subtracted is in the frequency domain.

BRIEF DESCRIPTION OF THE DRAWINGS

The above and other objects and features of the present general inventive concept will become apparent and more readily appreciated from the following description of the embodiments with reference to the following figures, wherein like reference numerals refer to like parts throughout the various figures unless otherwise specified, and wherein.

DETAILED DESCRIPTION

Figure 1:
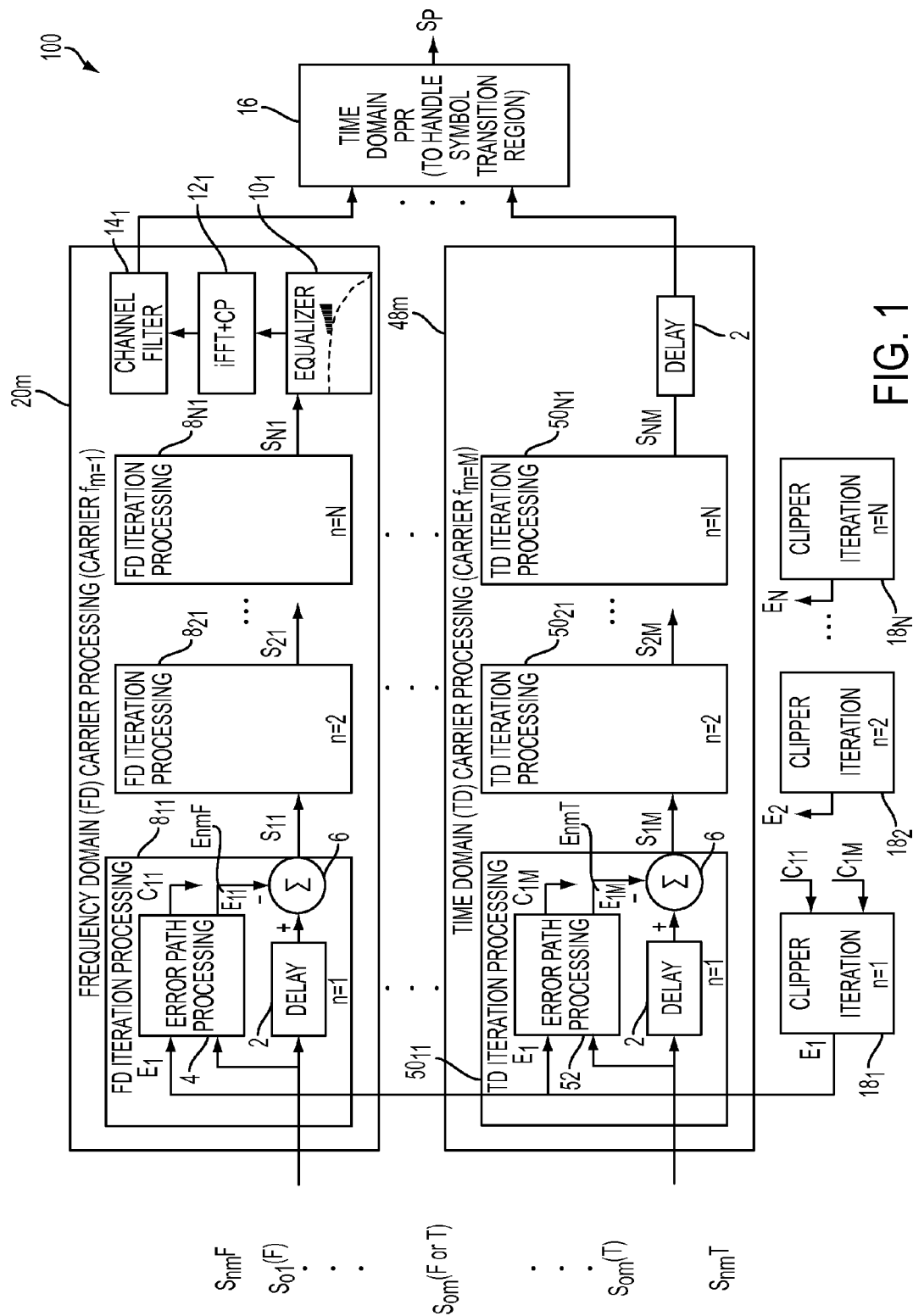
FIG. 1 is a high level block diagram of a frequency domain and time domain peak power reduction system according to an exemplary embodiment.

The inventive concept is described more fully hereinafter with reference to the accompanying drawings, in which embodiments of the inventive concept are shown. In the drawings, the size and relative sizes of layers and regions may be exaggerated for clarity. Like numbers refer to like elements throughout. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the invention is therefore defined by the appended claims. The following embodiments are discussed, for simplicity, with regard to the terminology and structure of a radio communication system using a power amplifier transmitter. However, the embodiments to be discussed next are not limited to these systems but may be applied to other wireless communication systems that are affected by the necessity to reduce peak power transmissions.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

Used throughout the specification are several acronyms, the meaning of which are provided as follows: orthogonal frequency division multiplexing (OFDM); error vector magnitude (EVM); peak-to-average power ratio (PAPR); peak power reduction (PPR); frequency-domain peak power reduction (FPPR); multi-carrier/technology peak power reduction (MPPR); Fast Fourier Transforms (FFTs); inverse Fast Fourier Transforms (iFFTs); cyclic prefix (CP); finite impulse response (FIR); numerically controlled oscillator (NCO); long term evolution (LTE); peak-to-average power ratio (PAPR); Worldwide Interoperability for Microwave Access (WiMAX); quadrature phase shift keying (QPSK); 64 quadrature amplitude modulation (64-QAM); end users (EU); advanced wireless services (AWS) band; personal communications services (PCS) band; code division multiple access (CDMA), and global system for mobile communications (GSM);

According to an exemplary embodiment, a multi-carrier/technology peak power reduction (MPPR) system 100, as shown in FIG. 1, performs peak power reduction on signals such as OFDM that are typically initially formed and represented in the frequency domain, while at the same time, i.e., in parallel, processing time domain signals using a time domain clip and filter method. Each iteration of peak power reduction, in the frequency domain, takes as an input the frequency domain representation of the signal from the previous iteration that has been altered with respect to an error signal also represented in the frequency domain (from the previous iteration), determines an error signal represented in the frequency domain, and subtracts this from a delayed version of the input to produce a further peak power reduced frequency domain signal (that is then fed forward to the next iteration). In parallel, and substantially simultaneously, each iteration of peak power reduction in the time domain takes as an input the time domain representation of the signal from the previous iteration that has been altered with respect to an error signal also represented in the time domain (from the previous iteration), determines an error signal represented in the time domain, and subtracts this from a delayed version of the input to produce a further peak power reduced time domain signal (that is then fed forward to the next iteration).

According to a further exemplary embodiment, many, if not all of the operations are performed in an error path so that computational complexity can be minimized as the quantization noise and other distortions have no effect on the main signal. According to still a further exemplary embodiment, if there are no peaks above the configured peak power reduction threshold, then the signal passes through the MPPR iterations with no change. This saves power and processing capabilities and does not distort the signal.

According to an exemplary embodiment, the frequency and time domain error signal (herein after referred to as the weighted error modified signal, and is output, in both a frequency domain form by frequency domain error path processing block 4, and in a time domain form by time domain error path processing block 52) is produced by first adding a cyclic prefix to the OFDM signal in frequency domain error path processing block 4, and then adding a corresponding time domain signal from time domain error path processing block 52, and then performing additional processing in clipper iteration block 18. According to a further exemplary embodiment, the window transition region between symbols is zeroed in a first path of the frequency domain error path processing block 4 in cyclic prefix adder 40, and is addressed in the second path of the frequency domain error path processing block 4, in symbol wrap adder 42. The time domain signal clipper iteration block output error signal (herein after referred to as the un-weighted error signal, and is the same for both the frequency domain error path processing block 4 and time domain error path processing block 52) is wrapped and added in frequency domain error path processing block 4 (in symbol wrap adder 42) prior to FFT conversion of the symbol to the frequency domain (which also, according to an exemplary embodiment, occurs in frequency domain error path processing block 4). Thus, according to an exemplary embodiment, the un-weighted error signal, formed by a combination of, and additional processing of, frequency domain carrier signals (in the time domain) and time domain carrier signals (in the time domain), is input to both the frequency domain error path processing block 4 and time domain error path processing block 52. However, the weighted error signals output from respective frequency domain error path processing block 4, $E_{nmF}$ and time domain error path processing block 50, $E_{nmT}$, are not the same, and are respectively in the frequency domain and time domain, as they are then used to alter the delayed version of the input carrier signals.

According to an exemplary embodiment, a first stage of MPPR processing in the frequency domain is performed in frequency domain error path processing block 4, and a first stage of MPPR processing is performed in the time domain in time domain error path processing block 52. Following the $N^{th}$ iterative stage of both the frequency domain and time domain first stage processing, the processed frequency domain and time domain carrier signals (both of which are now in the time domain), are processed in time domain peak power reduction (TD PPR) block 16. Operation of TD PPR block 16 is described in U.S. Published Patent Application No. 2012/0064848A1, entitled "Low Sample Rate Peak Power Reduction (LPPR)", to McGowan N., et al., the entire contents of which are incorporated herein by reference. TD PPR block 16 handles the small portions of the signal in the window transition region between OFDM symbols. The second stage, performed in clipper iteration block 18, takes as inputs the outputs from both frequency domain error path processing blocks 4, and time domain error path processing blocks 52. The window transition region (see FIG. 5) is the portion that is not included in the EVM performance measurement.

As discussed in greater detail below, and according to a further exemplary embodiment, the error signal is weighted according to the tolerance for distortion (EVM) for each sub-carrier. That is, different sub-carriers will have different weights applied, depending on the modulating technology being used for the particular sub-carrier. According to an exemplary embodiment, some portion of the spectrum in the guard band can be used to improve MPPR performance. According to a further exemplary embodiment, equalization can be performed on the spectrum in the guard band to improve MPPR performance and reduce filtering complexity. Equalization in accordance with the exemplary embodiments will emphasize, or boost, the sub-carriers found in the guard band region, that will be reduced by the filter roll off, thereby increasing PPR. According to a further exemplary embodiment, a normalization step can be performed on the error signal weights to ensure that the targeted peak reduction is met while minimizing EVM impact.

Interpolation between samples, for the frequency domain signals, can be useful to implement low sample rate processing, and ensures as many peaks as possible are found and operated on, and interpolation back to the original samples, is performed in the error path. The emissions caused by transitions between symbols can be reduced by using windowing as part of the conversion to the time domain after the MPPR iterations and is done according to an exemplary embodiment in the area of the signal that has no effect on EVM.

FIG. 1 is a high level block diagram of a multi-carrier/technology peak power reduction (MPPR) system 100 according to an exemplary embodiment. According to exemplary embodiments, a non-exhaustive list of current systems that can employ MPPR system 100 (and its associated methods) include long term evolution equipment (LTE), LTE advanced, and Worldwide Interoperability for Microwave Access, or WiMAX. WiMAX is a communication technology for wirelessly delivering high-speed Internet service to large geographical areas, at rates up to 75 MBs for personal users, and 1 Gbit/s for fixed stations. WiMAX has been promoted as an alternative to cable and DSL. However it will be appreciated that other types of systems could employ embodiments that are the same or similar to those described herein.

The inputs to the MPPR system 100 are M frequency domain and time domain baseband carrier signals, $S_{01(F\ or\ T)}$ through $S_{0M(F\ or\ T)}$, where m=1 ... M, is the carrier index, and M is the number of carriers that are used in the transmission system. According to exemplary embodiments, the number of frequency domain carrier signals and the number of time domain carrier signals can be the same or can be different, i.e., there can be more frequency domain carrier signals, or there can be more time domain carrier signals or there can be the same number of frequency and time domain carriers. The peak power reduction processing of each frequency based carrier signal $S_{0m(F)}$ is performed by frequency domain carrier processing blocks 20m, with one frequency domain carrier processing block 20 for each frequency domain baseband carrier signal $S_{0mn(F)}$. The peak power reduction processing of each time based carrier signal $S_{0m(T)}$ is performed by time domain carrier processing blocks 48m, with one time domain carrier processing block 48 for each time domain baseband carrier signal $S_{0m(T)}$. Frequency domain carrier processing block 20$_1$ consists of N sequential frequency domain iteration processing block 8$_{n1}$, followed by equalizer 10, inverse Fast Fourier Transform (iFFT) block 12, which also includes a cyclic prefix (CP) insertion portion, and channel filter block 14. According to an exemplary embodiment, channel filter block 14 can be, for example, a finite impulse response (FIR) filter, among other filter types. Time domain carrier processing block 48$_M$ consists of N sequential time domain iteration processing blocks 50$_{nm}$, and wherein the output of the last time domain iteration processing blocks 50$_{NM}$ of each time domain carrier processing blocks 48m is input to a delay circuit 2, which incorporates a delay Δt such that the output of each time domain carrier processor block 48m is substantially lined up with each of the outputs from FD carrier processing blocks 20m. The output of delay 2 of each TD carrier processor block 48m is then input to time domain peak power reduction (TD PPR) block 16 along with all of the outputs from each frequency domain carrier processing block 20. "N", the number of iterations, can be related to, as discussed in greater detail below according to an exemplary embodiment, operation of phase slope block 24 (located in error path processing block 4), and the amount of sample shifting points that should be added in order to obtain the peaks. Each of the components of MPPR system 100 will now be described in greater detail.

Frequency Domain (FD) Iteration Processing Block 8

Each FD iteration processing block 8$_{nm}$ (according to an exemplary embodiment, there is N iteration processing blocks 8 per carrier processing block 20, and there are up to M carrier processing blocks 20), includes error path processing block 4, delay 2, and first adder 6. The first iteration processing block 8$_{1m}$ of each carrier processing block 20 accepts as inputs sub-carrier signal $S_{0m}$ for that particular carrier pertaining to the carrier processing block 20, and the output $E_n$ of first clipper iteration block 18$_n$. First FD iteration processing block 8$_{1m}$ outputs two signals according to an exemplary embodiment: first adder output signal $S_{11}$, and $C_{11}$, wherein signal $C_{11}$ is the output of error path processing block 4, and which is fed into first clipper iteration block 18$_1$, as discussed in greater detail below. The frequency domain fed-forward sub-carrier signal, $S_{11}$, which is also the first adder output signal $S_{11}$, is fed into the following iteration processing block 8$_{21}$ (as briefly discussed above), along with the output of second clipper iteration block 18$_2$. Thus, each iteration processing block 8$_{nm}$ accepts as inputs the previously processed—fed forward—sub-carrier signal $S_{(n-1)m}$, and the output of the clipper iteration block 18$_n$, in order to apply modifications to the sub-carrier signals $S_{(n-1)m}$, which are discussed in greater detail below.

Iteration processing block 8$_{nm}$ is responsible for error path processing, which occurs within error path processing block 4, and adding a delayed version of the input signal to the error signal $E_{nm}$, and for generating the fed-forward frequency domain signal $S_{(n-1)m}$ that is generated by error path processing block 4. The output of error path processing block 4 $E_{nm}$ is then subtracted from a delayed version of the signal input to the iteration processing block 8, $S_{(n-1)m}$, wherein according to an exemplary embodiment, the delay is equal to the error processing delay that occurs within error path processing block 4 and clipper iteration block 18.

Error Path Processing Block 4

Figure 2:
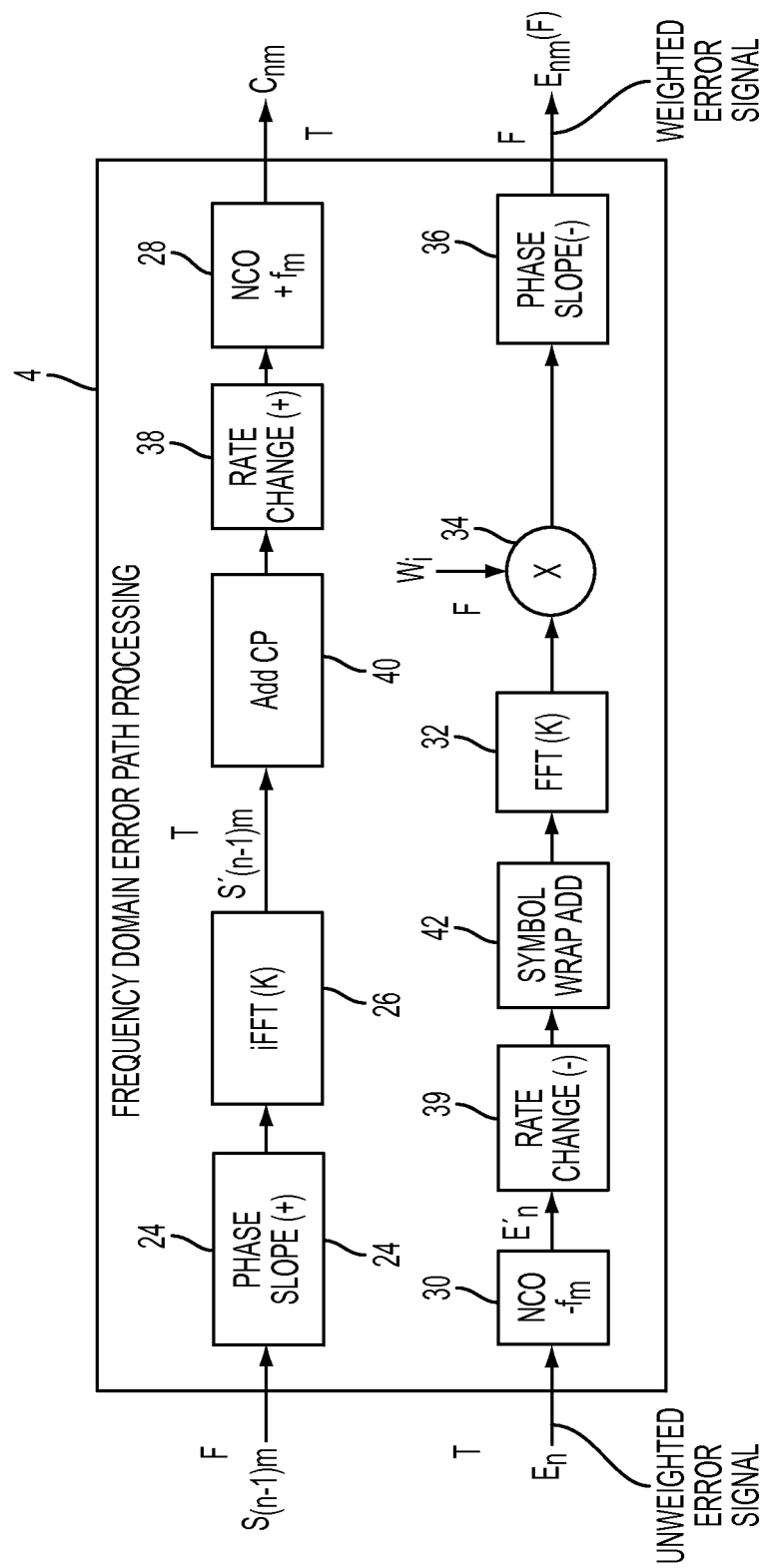
FIG. 2 is a detailed block diagram of a frequency domain error path processing block shown in FIG. 1 according to an exemplary embodiment.

FIG. 2 is a detailed block diagram of a first embodiment of error path processing block 4 shown in FIG. 1 according to an exemplary embodiment. The inputs to each error path processing block 4 are signals $S_{(n-1)m}$, and $E_n$. Signal $E_n$ is the output of clipper iteration block 18, and is in the time domain. Signal $S_{(n-1)m}$, in the frequency domain, is the first of up to M carrier signals, in its original form, and is input to positive phase slope circuit 24. According to an exemplary embodiment, it is necessary to perform the equivalent of high rate sampling in order to capture all of the peaks of the frequency domain sub-carrier signal $S_{(n-1)m}$, to know how much to reduce the input signal by in order to avoid attempting to transmit signals that exceed the capability of the power transmitter. The equivalent of a high rate of sampling is achieved by phase shifting the input signal in the frequency domain so that a time shifted interpolated signal occurs in the time domain, meaning that peaks between the original samples are visible to clipper block 18.

Figure 9:
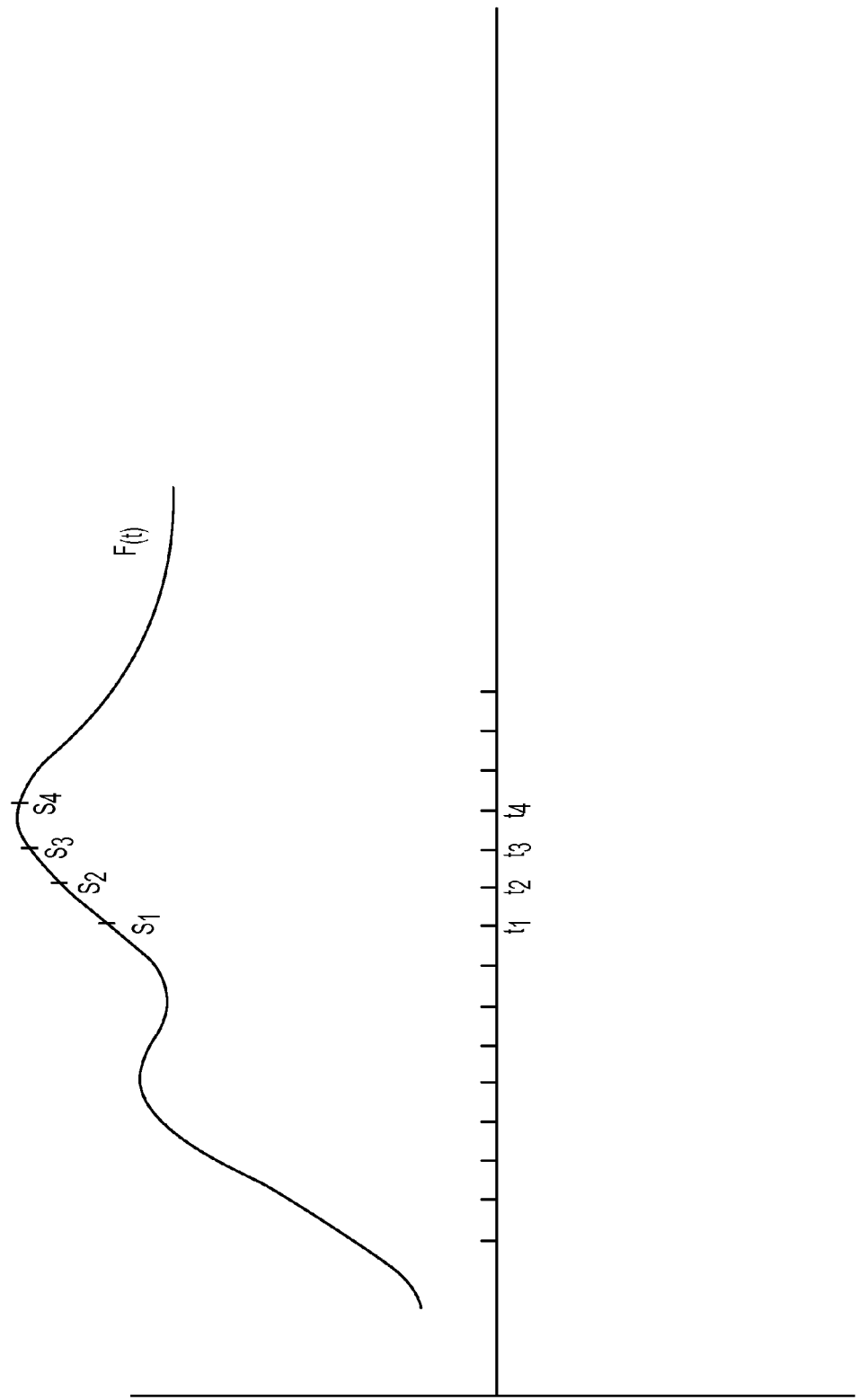
FIG. 9 is an illustration of a signal in the time domain that shows the effect of changes in sample points resulting from adding a changeable amount of phase slope to the signal in the frequency domain according to an exemplary embodiment.

The input to error path processing block 4 is the frequency domain sub-carrier signal $S_{(n-1)m}$, and it is first input to positive phase slope circuit 24 as shown in FIG. 2. Positive phase slope circuit 24 adds a changeable amount of phase slope to the input signal. According to an exemplary embodiment, positive phase slope circuit 24 can be implemented as a negative phase slope circuit, with a corresponding positive phase slope circuit used in place of circuit 36, which is discussed in greater detail below. According to a further exemplary embodiment, the changeable amount of phase is iteration dependent, and this is discussed in greater detail below. When the changeable amount of phase is added to the input signal, and then the input signal is changed to the time domain (as which occurs in iFFT circuit 26, discussed in greater detail below), a fractional delay is added to the time domain signal. Several examples of fractional time delays for a time domain signal are shown in FIG. 9. Referring briefly to FIG. 9, the sampled signal, in the time domain is sampled several times, at $s_1$, $s_2$, $s_3$, and $s_n$, and up to $s_N$, where n=1 ... N, the number of iterations in each sub-carrier processing block 20. There are n sampling points, but the first sample point is the sampling point with 0° of changeable amount of phase. Sample point $s_1$ is the original sampling point in time, and $s_2$ occurs because of a first changeable phase amount added to the input signal in the frequency domain, and the same applies to $s_3$ and $s_4$. Thus, it can be seen that by adding one or more changeable amounts of phase to the input signal it is possible to be at or near the peak, which can be used to determine how much of the signal to substantially eliminate or reduce to avoid overdriving the power transmitter.

According to an exemplary embodiment, as discussed above, the changeable amount of phase can be changed according to the iteration. For example, in the first carrier processing block 20m, there are N iterations of iteration processing block 8, and these process the first carrier $S_{0,1}$. Thus, for a first iteration, iteration processing block $8_{11}$, the changeable phase amount could be 0°, as this is a good first position to determine whether a peak exists or not, then incremental phase changes are added.

According to an exemplary embodiment, the phase slope is created by changing the phase of each sub-carrier (with sub-carrier index k) by:

$$\phi(k, n) = 2\pi \left( \frac{2k - K}{2} \right) \frac{\Delta(p(n))}{K} \quad \text{Eq. 1}$$

where, $$\Delta(p(n)) = \frac{p(n) - 1}{N}. \quad \text{Eq. 2}$$

and where the optimum choice of linear phase slope for each iteration n is determined by the order p(n)

$$p(n) \in \{0, 1, \ldots, N-1\}$$

For example with N=4, p(1)=0, p(2)=2, p(3)=1, p(4)=3.

According to further exemplary embodiments, the number of iterations will be related to how many different time domain points are desired to be examined for peaks. The greater the number of iterations, the finer the resolution of time domain points. Of course, as those of ordinary skill in the art can appreciate, the greater the number of iterations, the more complex MPPR system 100 becomes in terms of implementation, and thus more expensive, and the longer time it takes to process the carrier signals prior to transmission. Thus, positive phase slope circuit 24 produces an interpolated fractional delay of the input signal in the time domain. According to a preferred exemplary embodiment, the fractional delay enables low sample rate peak power reduction, as it represents the peaks (at the fractional delay points) between the actual signal sampling points. According to still a further exemplary embodiment, it would be possible to add a fractional interpolation circuit after iFFT 26 (discussed below) and achieve the same effect as positive phase slope circuit 24.

$S_{(n-1)m}$, with a first changeable amount of phase, is then converted to the time domain signal $S'_{(n-1)m}$ by performing a K-point inverse Fast Fourier Transform (iFFT) in inverse Fast Fourier Transform (IFFT) block 26. The time domain signal, $S'_{(n-1)m}$, is then input to cyclic prefix adder 40. Cyclic prefix adder 40 adds the cyclic prefix as required by the technology (for example LTE). $S'_{(n-1)m}$ is then mixed in first numerically controlled oscillator (first NCO) circuit 28 to the carrier frequency $+f_m$ to produce the output signal $C_{nm}$. $C_{nm}$ is a time domain signal. First NCO circuit 28 performs a frequency shift such that the signal is translated to the correct relative center frequency compared to the other carriers before they are all added together. For each carrier, a different $f_m$ is applied to the input signal. If there was only one carrier signal, then according to further exemplary embodiments, there would not be a need for first NCO circuit 28, or the NCO frequency would be set to 0 Hz. By way of a non-limiting example, if there are two carriers, each with a bandwidth of 10 MHz, a first NCO circuit 28 could shift the first carrier to $f_1=+5$ MHz, and a second NCO circuit $f_2$ could shift the other carrier $f_2=-5$ MHz, so that in the frequency domain, there are two 10 MHz signals adjacent to each other.

According to a further exemplary embodiment, the sample rate of $C_{nm}$ should be the same for all of the carriers. This can be accomplished by padding the input to iFFT block 26 with zeroes for the lower sample rate (lower bandwidth) carriers to the sample rate of the highest sample rate sub-carrier, or by using rate change (RC) increase circuit 38 (discussed in greater detail below). According to a further exemplary embodiment, the sample rate of $C_{nm}$ may even be below the Nyquist rate of the combined signal. In general, the lower the sample rate compared to the Nyquist rate of the combined signal, the larger the number of iterations required. A single sub-carrier may be split into two or more sub-carriers by splitting the frequency domain samples into sub-bands (each sub-band is then treated as a separate carrier) and reducing K and the sample rate. Multiple carriers may be combined into one larger bandwidth carrier by combining the frequency domain samples and increasing K and the sample rate.

Also shown in FIG. 2 is optional rate change (RC) increase circuit 38. RC increase circuit 38 increases the number of time domain samples by some factor R, for example 2. Through use of RC increase circuit 38, the K number of time domain components created by IFFT circuit 28 is increased by the factor R, to 2K, or 4K, by way of non-limiting example only. If, for example, there are K frequency domain components, but it is desired that there be 2K, or even 4K time domain components, then R, the rate "multiplier" is set to the appropriate factor, and the result is there is an equivalent increased amount of sampling of the signal in the time domain. This means that less frequency shifts needed to be performed by the positive phase slope circuit 24 in order to find all of the peaks between the original sample points, or the best peak values. As discussed above, positive phase slope circuit 24 adds a certain changeable amount of phase increment to each component of the frequency domain signal, which is equivalent to adding a fractional time shift to the time domain signal. If the sampling points do not change, then the now fractional time shifted time domain signal will show the interpolated peaks to the clipper block 18, as discussed above. But, by now adding more time domain sample points to sample with RC increase circuit 38, even less phase change increments need to be made because more points will be checked for peak values by the clipper block 38 that might have been overlooked. According to an exemplary embodiment, fewer iterations will be needed as a result because, as discussed above, the clipper in each iteration processing stage will have more "visibility" of the actual peaks between the original sample points. The reduction in iteration processing stages can reduce the latency of the MPPR processing. However, each processing iteration stage will handle a larger number of samples and, as those of ordinary skill in the art can appreciate, use of RC increase circuit 38 increases the complexity and costs of MPPR system 100.

According to a further exemplary embodiment, it is important that the sample rates of the frequency domain signals, when in the time domain, be substantially similar to sample rates of the carrier signals that were originally in the time domain, i.e., the inputs to TD carrier processing blocks 48, $S_{nm(T)}$. Therefore, if it is determined that the rates are different, RC increase circuit 38 in FD error path processing block 4 can change the sample rate so that they are the same. According to a further exemplary embodiment, the sample rate of the TD carriers can use RC increase circuit 38 to increase the sample rates as well (see FIG. 3).

Figure 5:
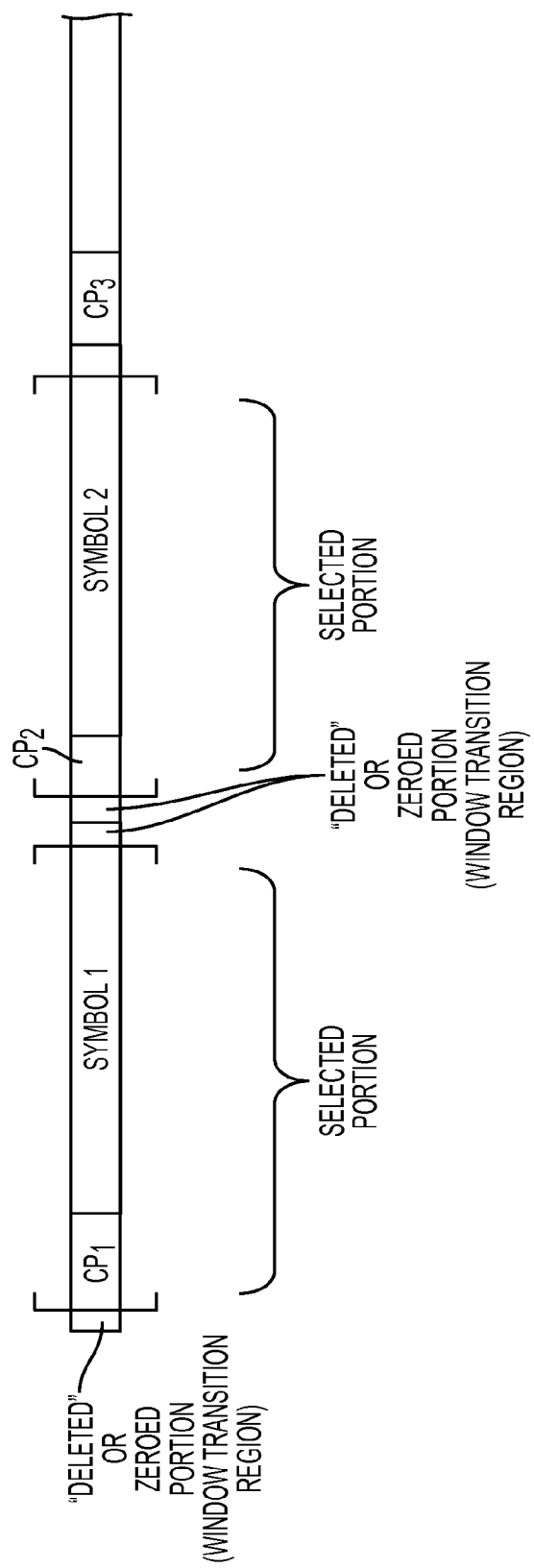
FIG. 5 is an illustration of the effects of error vector magnitude selection by the select EVM portion circuit shown in FIG. 4 according to an exemplary embodiment.

Although a discussion of all of the components of first error path processing block 4 has not been completed, focus will now be directed first to the top row of time domain error path processing block 52, and then to clipper iteration block 18 shown in FIG. 5. Clipper iteration block 18 will be discussed in detail, and then discussion will return to the bottom row of FD error path processing block 4, with respect to FIG. 2, and then to the bottom row of TD error path processing block 52.

Time Domain Error Path Processing Block 52

Figure 3:
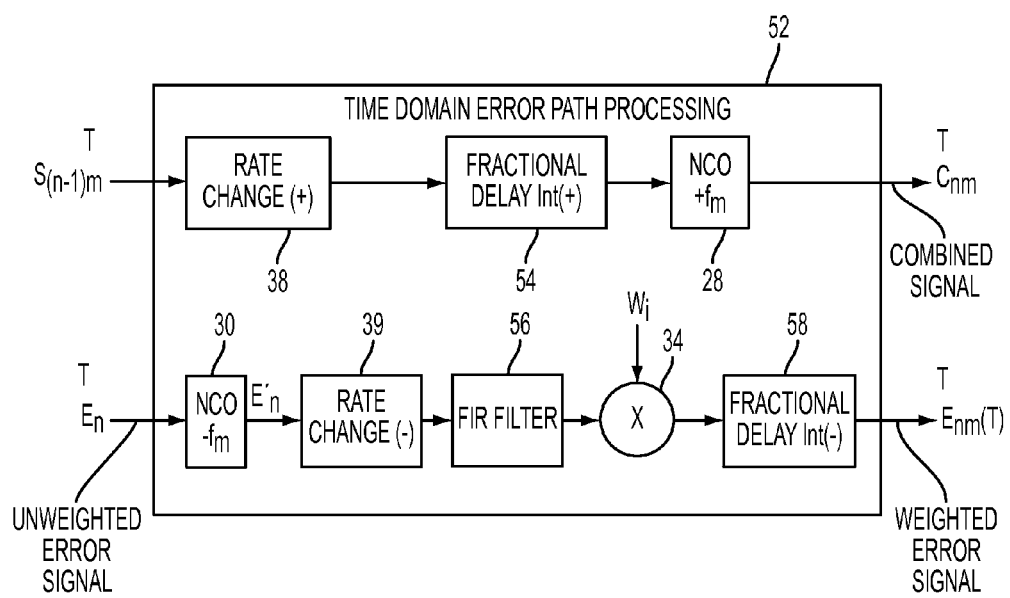
FIG. 3 is a detailed block diagram of a time domain error path processing block shown in FIG. 1 according to an exemplary embodiment.

Time domain (TD) error path processing block 52, shown in FIG. 3, includes, on a top row, RC increase circuit 38, fractional delay interpolator circuit 54, and NCO 28. TD error path processing block 52 further includes on a bottom row, NCO 30, FIR filter 56, mixer/multiplier circuit 34, and fractional delay interpolator 58.

The inputs to the error path processing block are the signals $S_{(n-1)m(T)}$ and $E_n$, wherein $E_n$ can also be referred to as the un-weighted error signal $E_n$, and is the output of the iteration n clipper block 18. As discussed above, RC increase circuit 38 can change the sample rate of the input time domain signals, $S_{(n-1)m(T)}$. Following RC increase circuit 38 is fraction delay interpolator circuit 54. According to an exemplary embodiment, adding a fractional delay facilitates low sample rate peak power reduction, as it represents the peaks (at the fractional delay points) between the actual signal sampling points. According to further exemplary embodiments, fractional delay interpolator circuit 54 is substantially similar in function to positive phase slope circuit 24, discussed above in regard to FIG. 2, and FD error path processing block 4. The signal is then mixed with NCO circuit 28 to the carrier frequency $+f_m$ to produce the output signal $C_{nm}$. First NCO circuit 28 performs a frequency shift such that the signal is translated to the correct relative center frequency compared to the other carriers before they are all added together. For each carrier, a different $f_m$ is applied to the input signal. If there was only one carrier signal, then according to further exemplary embodiments, there would not be a need for first NCO circuit 28, or the NCO frequency will be set to zero. The M error path output signals of iteration n are then inserted into the iteration n clipper iteration block 18, as shown in FIG. 4.

Clipper Iteration Block 18

Figure 4:
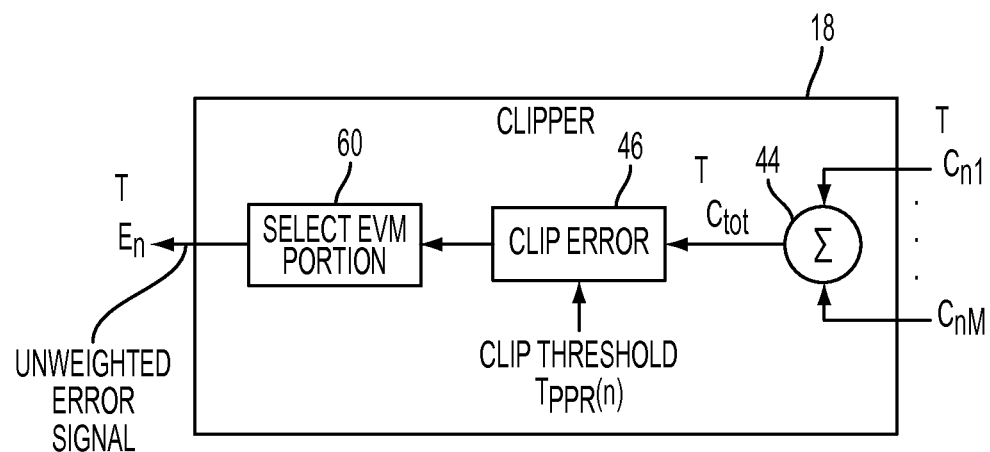
FIG. 4 is a detailed block diagram of a clipper iteration block shown in FIG. 1 according to an exemplary embodiment.

The up to M error path output signals, in the time domain, of each iteration n, are then inserted into a respective clipper iteration block 18, which is shown in greater detail in FIG. 4. For example, if there were a total of 10 carrier processing blocks 20 and 48, there would be ten inputs into each of clipper iteration block $18_1$, $18_2$, $18_3$, and so on, up to clipper iteration block $18_N$, where n=1 .... N, and "N" is the number of iterations in each FD carrier processing block 20 and TD carrier processing blocks 48 (there being, according to a preferred exemplary embodiment, the same number of iterations per FD carrier processing blocks 20 and TD carrier processing blocks 48, though according to a further exemplary embodiment, this need not necessarily be the case, i.e., there could be a different number of iterations in FD carrier processing blocks 20 versus those of TD carrier processing blocks 48).

The input signals $C_{nm}$ to clipper iteration block $18_1$, though in the time domain, are now correctly positioned in the frequency domain through the operation of NCO circuits 28. All of the outputs from the error path processing blocks 4, $C_{nm}$, are summed at summer 44 to produce the total signal $C_{tot}$. $C_{tot}$ is a time domain signal, and is compared to $T_{PPR(n)}$ in clipper error circuit 46. $T_{PPR(n)}$ is a threshold amount for iteration stage n, and according to a further exemplary embodiment, can be the same or different for each of the different iterations n and can change per iteration stage n, for each carrier processing block 20 or 48, or can be the same for each iteration stage n in each carrier processing block 20 or 48. According to an exemplary embodiment, total signal $C_{tot}$ represents the peaks of the summed time domain signals that will be used to modify the input signals $S_{(n-1)m}$ to reduce the total PAPR. According to a further exemplary embodiment, an error signal $E_n$ is produced by clip error circuit 46 when the power of $C_{tot}$ exceeds the peak power threshold ($T_{PPR(n)}$). The error signal, $E_n$, represents the portion of the input signal ($C_{tot}$) that exceeds the predetermined peak power threshold $T_{PPR}(n)$, the output of clipper iteration block 18. Each $E_n$ signal output from respective clipper iteration blocks 18 is input to each respective FD error path processing block $8_{nm}$ and TD error path processing block $52_{nm}$ according to further exemplary embodiments. For example, as shown in FIG. 1, $E_1$ is input to each of FD error processing blocks $8_{11}$, $8_{12}$, through $8_{1N}$, and FD error processing blocks $50_{11}$, $50_{12}$, through $50_{1N}$. However, if, by way of example only, $C_{tot}$ did not exceed $T_{PPR(n)}$, then $E_n$ would be 0. The error signal, $E_n$, is calculated in clip error block 46 by the following equation:

$$E_n = \left[1 - \frac{\sqrt{T_{PPR}(n)}}{|C_{tot}|}\right] C_{tot} \qquad \text{Eq. 3}$$

The error signal can be re-written as:

$$E_n = f(u) C_{tot} \qquad \text{Eq. 4}$$

where $$f(u) = \begin{cases} 0; & u \leq 1 \\ 1 - \frac{1}{\sqrt{u}}; & u > 1 \end{cases} \qquad \text{Eq. 5}$$

and, $$u = \frac{|C_{tot}|^2}{T_{PPR}(n)} = \frac{1}{T_{PPR}(n)} |C_{tot}|^2 \qquad \text{Eq. 6}$$

$E_n$, at the output of each respective clipper iteration block 18, can be referred to as the un-weighted error signal. Prior to being output from clipper iteration block 18, however, select EVM portion circuit 60 processes the output of clip error circuit 46. Select EVM portion circuit 60 zeros the very small percentage of the error signal $E_n$ that pertains to the transition region for the OFDM carriers. The transition region is a portion of the signal wherein distortions and noise do not affect the overall performance measurement characteristics of the signal. The standards specifically isolate that portion of the transmitted signal as not affecting the EVM specification because it is an inherently difficult portion of the transmission signal to control. The user equipment does not look at the portion of the signal when deciphering the transmitted signal, so in effect, the transition region has little or no effect on the performance of the communications system. Select EVM circuit 60 isolates and sets that portion of the signal to zero, and this generally amounts to about 3% of the signal. FIG. 5, according to an exemplary embodiment, illustrates the operation of select EVM block 60 on the un-weighted error signal $E_n$. In FIG. 5, there are two symbols shown, each with its own cyclic prefix (CP), CP1 and symbol 1, and CP2 and symbol 2. The bracketed portion is that part of the CP and symbol signal that is passing substantially undisturbed through the select EVM circuit 60, and the other portion is that part that select EVM circuit 60 is setting to zero. Note, however, that select EVM portion circuit 60 also zeros out a portion at the end of the symbol portion of the transmitted signal.

The combined, clipped, un-weighted error signal is then passed to the FD iteration processing blocks 4 and TD iteration processing blocks 52 shown in FIG. 1.

Referring back to FIG. 2, and FD error path processing block 4, $E_n$, the error output signal from clipper block 18, is input into second NCO 30. Second NCO 30 will shift the error signal $E_n$ by $-f_m$, to produce $E'_n$. Recall that it was discussed above that first NCO 28 translated the time domain signal $S'_{(n-1)m}$ by a frequency of $+f_m$, so now the error signal $E_n$, which is in effect related to all of the $C_{nm}$ signals output from first NCO 28, now has to be translated by the same frequency $-f_m$. Each component of the error signal $E_n$ will be translated by $f_m$ to its proper center frequency, and the output of second NCO 30 is $E'_n$. Each FD and TD carrier processing block 20, 48 has its own particular $f_n$.

Figure 6:
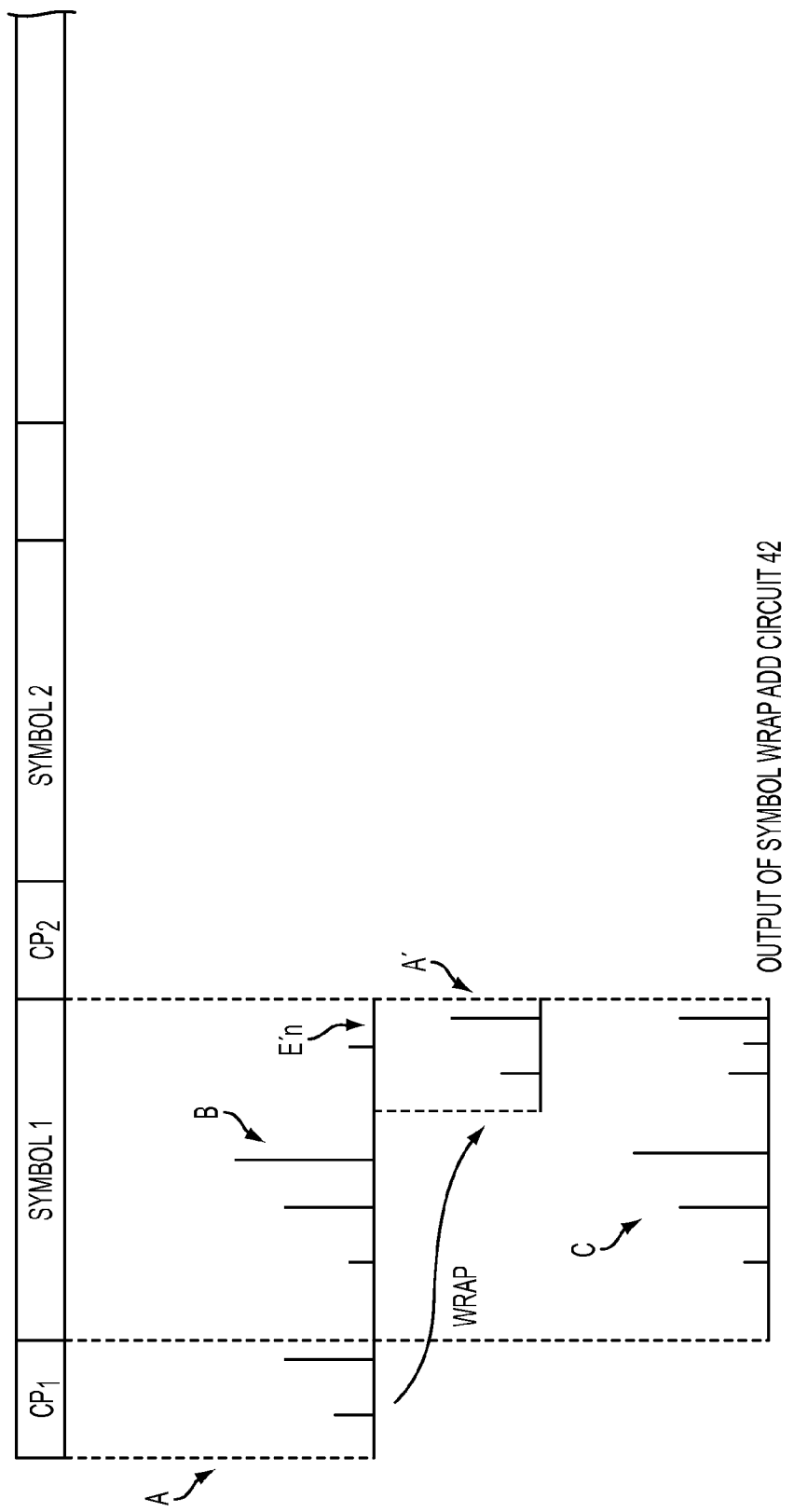
FIG. 6 is an illustration of the effects of symbol wrap and add in the frequency domain error path processing block according to an exemplary embodiment.

The signal $E'_n$ is then input into symbol wrap add circuit 42. FIG. 6 is an illustration of the effects of symbol wrap and add in the frequency domain error path processing block according to an exemplary embodiment. As those of ordinary skill in the art can appreciate, OFDM signals include a symbol porting and a cyclic prefix (CP) portion. FIG. 6 shows symbol 1, with its CP1, and symbol 2, and CP 2 as part of an OFDM signal.

Although the receiver is typically configured to discard the cyclic prefix samples, and a detailed discussion of the use of the cyclic prefix is both unnecessary to understand the scope of the exemplary embodiments, and beyond the general scope of this discussion, it is relevant to understand that the cyclic prefix performs at least two important functions in OFDM signaling: first, it operates as a guard interval between a preceding symbol and a subsequent symbol. As a guard interval it substantially eliminates or reduces inter-symbol interference between the two symbols. In addition, because in practice it is implemented to repeat data already present in the symbol, as a repetition of the end of the symbol, it allows the linear convolution of a frequency-selective multipath channel to be modeled as circular convolution, which in turn may be transformed to the frequency domain using a discrete Fourier transform. That is, cyclic prefixes are merely copies of the end portion of the symbol that are then added to the beginning, hence the term cyclic prefix. Thus, the data of the cyclic prefix is present at the beginning of the signal and at the end.

Referring to FIG. 6, the signals on the top show two symbols, with their respective CPs, CP1 for symbol 1, and CP2 for symbol 2. Below the signals on the top is an example of an un-weighted error signal, $E'_n$, showing two peaks A in the cyclic prefix area, and three peaks in the main portion of the symbol area, at B. As those of ordinary skill in the art can appreciate, maintaining orthogonality within the OFDM signal is critical in terms of performance characteristics. It has been determined that unless the peaks that are now present in the cyclic prefix portion of a symbol are added to the end portion of the symbol, then orthogonality cannot be maintained. Thus, as shown in FIG. 6, a wrap function is first implemented in symbol wrap add circuit 42, which essentially copies or time shifts the A peaks, making them the A' peaks time-wise at the appropriate position at the end of the symbol signal. Then, an add function is performed, wherein the A' peaks are added back to the symbol signal, creating the new un-weighted error signal, E'n, which is shown at C in FIG. 6. The peak signals shown as C are a combination of A' and B.

The time domain un-weighted error signal $E'_n$, following the symbol wrap add circuit 42, is then converted with a K-point FFT, in FFT block 32, to the frequency domain. According to a further exemplary embodiment, the FFT and iFFT include identical amounts of points K, in a preferred exemplary embodiment, K=1024. When the cyclic prefix is created and added to the symbol, as shown in FIGS. 5 and 6, additional points are added, and when the FFT is performed, only 1024 can be selected and as a consequence, some peaks may end up being missed. For this additional reasons, the wrap and add is performed, and this reduces the number of points down to 1024.

Figure 7:
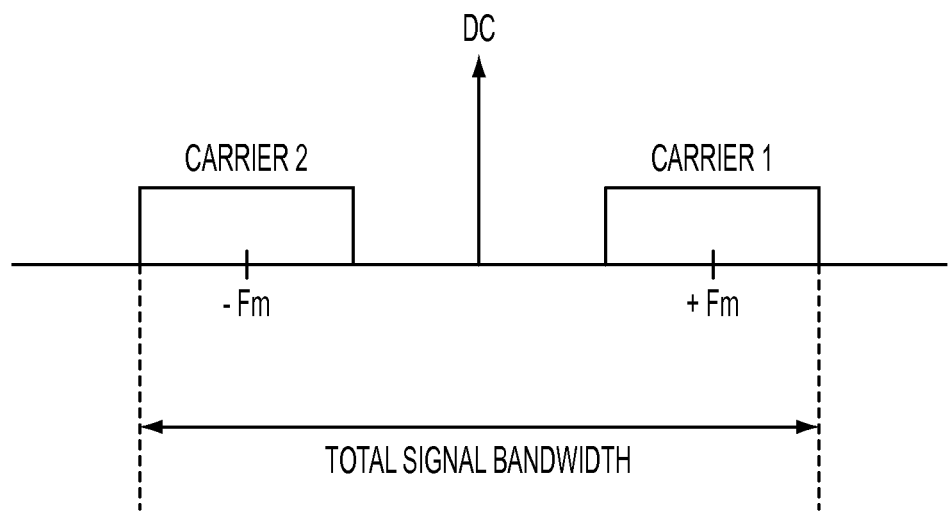
FIG. 7 illustrates the total signal bandwidth for two carriers in a communications system.

Note that in several of the figures, there are the designation of "T" and "F" at several locations: these indicate whether the signal is in the time domain (T) or frequency domain (F). The time domain signal $E'_n$ is transformed into its separate frequency domain individual sub-carriers in FFT circuit 32. A normalized weight value $W_i$ is applied to each frequency component i in multiplier 34, where:

$$W_i = \frac{\sigma K w_i}{\sum_{i=0}^{K-1} w_i} = \frac{\sigma B_T w_i}{\sum_{i=0}^{K-1} B_{w_i}} \qquad \text{Eq. 5}$$

with $B_T$ being the total signal bandwidth, and $B_{w_i}$ the spectral density of each weight component $w_i$. Total signal bandwidth includes the bandwidth from the edges of the outside carriers. FIG. 7 illustrates the total signal bandwidth for two carriers. Except for the case in which the clipped energy is allowed in the guard band regions, the weight value of the sub-carriers $w_i$ in the guard band will be equal to zero.

The weight value, $w_i$, controls the amount of clipped energy that will fall on the frequency component i, K is the size of the FFT, and $\sigma$ is the re-growth factor. According to a first embodiment, re-growth factor $\sigma$ is typically between about 0.3 and about 1.0. According to a preferred exemplary embodiment, the re-growth factor $\sigma$ is between 0 and 1.0. The re-growth factor controls the overall distortion of the signal and is a function of the number of iterations. The purpose of multiplying $W_i$, the weighting factor, against the frequency domain representation of $E'_n$, which is the error signal in the frequency domain, it to (a) substantially isolate or eliminate those frequency components that do not correspond or pertain to the frequency band of the specific carrier processing block 20, and (b) to control the amount of error signal that will then be removed from the original carrier input signal, $S_{(n-1)m}$. The net result is that some of the different sub-carriers are set to zero, some are strengthened, and some are attenuated.

According to an exemplary embodiment, in a typical OFDM carrier scheme, wherein there are 600 different 15 kHz frequency sub-carrier components (as well as 60 guard band sub-carriers, and 364 out-of-band sub-carriers) for a bandwidth of 10 MHz (although, as one of ordinary skill in the art can appreciate, the 10 MHz bandwidth is but one of a plurality of exemplary bandwidths, and as such is a non-limiting example), each will get a weighting factor that is particularly tailored to the modulation and coding scheme that the sub-carrier employs. According to a further exemplary embodiment, each sub-carrier can have its own weighting factor, or an individual weighting factor can be applied to a plurality of sub-carriers and so on. According to still a further exemplary embodiment, the guard band carriers can be given weighting factors $W_i$ such that no excess "clipped" energy is absorbed by the guard band carriers; in this latter case, if there is any excess "clipped" energy, it can be absorbed by one or more sub-carriers that pertain to different noise-tolerant modulation schemes, as more fully described below.

For example, according to an exemplary embodiment, quadrature phase shift keying (QPSK) can be used for end users (EU) that are experiencing a significant amount of noise—that is, they are operating in a poor radio environment. As can be appreciated by those of ordinary skill in the art, QPSK modulation is fairly tolerant of noisy environments, and therefore $w_i$ will be higher (though not more than 1, as a 1 indicates a maximum amount of energy), meaning that more of the clipping energy will fall on that component versus that of some other components of the sub-carriers.

According to a further exemplary embodiment, a modulation/coding scheme that has a very high signal-to-noise ratio (SNR), and which can be used in an environment that is not receiving very much noise is 64 quadrature amplitude modulation (64-QAM). As those of ordinary skill in the art can appreciate, 64-QAM modulation schemes convey significant amounts of information very effectively and efficiently, but need relatively noise-less or noise-free environments due to the closeness in amplitude and phase between different symbols. According to an exemplary embodiment, a lower weighting factor is used for these types of signals to substantially eliminate or reduce the clipped energy, in order to provide a cleaner, that is relative noise free, version of the sub-carrier signal as possible.

According to an exemplary embodiment, it is possible that all or some of the guard band sub-carriers can be allocated outside of the normal pass-band sub-carrier frequency components, so that their weight values $w_i$ can have a value of 1, as discussed above. These guard band sub-carriers do not take any spectrum away from the in-band sub-carriers and therefore do not result in any impact to the capacity of the carrier (i.e., these are not reserved tones or reserved sub-carriers). Thus, a weighting factor of $w_i=1$, when applied to the guard-band sub-carriers, means that the guard-band sub-carrier receive excess clipped energy that would otherwise be attenuated, or discarded, thereby reducing the efficiency of the transmissions, and are allowed to be output from its respective iteration processing block 8.

Following the factoring in of the weighting factor $W_i$ in multiplier circuit 34, the now weighted error signal, in the frequency domain, is input to negative phase slope circuit 36, which applies an opposite amount of phase shift (relative to block 24) to the frequency domain weighted error signal. This, of course, means that a proportionate amount of time shifting occurs when translated back to the time domain (in, for example, at iFFT circuit 12), essentially putting the signal—whether it be in the time or frequency domain—at the same sample point that it was before entering iteration path processing block $8_{nm}$. The output of negative phase slope circuit 36, $E_{nmF}$, is also the output of FD error path processing block 4, which is then input to first adder circuit 6 (shown in FIG. 1). $E_{nmF}$ is subtracted from a delayed version of the input signal $S_{(n-1)m}$ (the delay being substantially equal to the processing delay of error path processing block 4 and clipper iteration block 18), so that the error signal $E_{nmF}$ is aligned with the input signal, and the resultant output of iteration processing block $8_{nm}$, $S_{nm}$ is the frequency domain input signal to the next iteration processing block $8_{(n+1)m}$, and so on, until all N stages of iteration are accomplished for each FD carrier processing block 20$m$ (one for each carrier signal).

Time Domain Error Path Processing Block 52

Attention is again directed to FIG. 3, TD error path processing block 52, and the bottom row, wherein the un-weighted error signal, $E_n$, is input to second NCO 30. Second NCO 30 returns the un-weighted error signal back to its baseband frequency. Second NCO 30 will shift the error signal $E_n$ by $-f_m$, to produce $E'_n$. Recall that it was discussed above that first NCO 28 translated the time domain signal $S'_{(n-1)m(T)}$ by a frequency of $+f_m$, so now the error signal $E_n$, which is in effect related to all of the $C_{nm}$ signals output from first NCO 28, now has to be translated by the opposite frequency $-f_m$. The output of second NCO 30 is $E'_n$. Each FD and TD carrier processing block 20, 48 has its own particular $f_m$.

The output of second NCO 30 is then input to rate change (RC) decrease circuit 39. RC decrease circuit 39 changes back the time domain error signal $E'_n$ to its original sample rate corresponding to the original number of frequency domain points.

Figure 8:
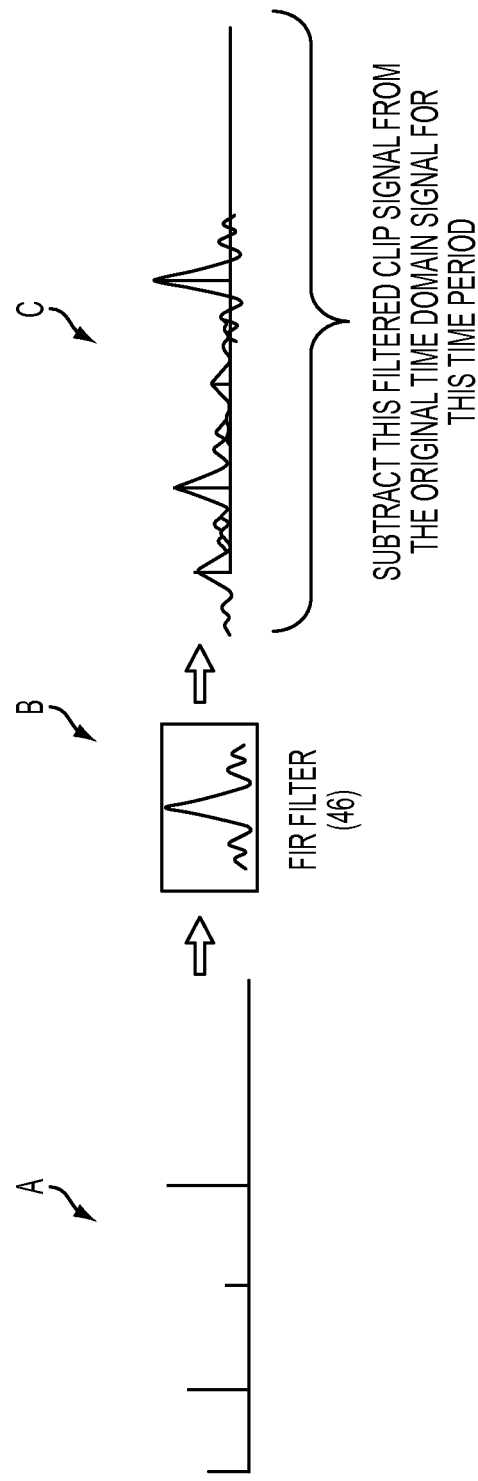
FIG. 8 is an illustration of the effects of filtering by a finite impulse response filter in the time domain error path processing block according to an exemplary embodiment.

$E'_n$ is then input to FIR filter 56. Those skilled in the art can appreciate that other types of filters can be used. According to an exemplary embodiment, FIR filter 56 is implemented as a low pass filter, as shown in FIG. 8. As is well known to those of ordinary skill in the art, FIR filters have a specific response, in the form of an impulse response, as shown at B in FIG. 8. By filtering the received un-weighted error signal $E'_n$ (shown by A in FIG. 8) with the FIR filter, the error signal—i.e., the peaks—are re-shaped by the FIR filter producing the signal shown at C in FIG. 8. At either end of the time domain signal, there are "tails" that extend to the left and right; each of these tails need to be preserved in order to fully represent the filtered error signals.

Following filtering by FIR filter 46, the error signal is weighted in mixer 34 with weighting values $W_i$. However, in this case, because the error signals represent time domain signals, such as WCDMA, there is typically a single $W_i$ for the entire bandwidth. In further contrast to the OFDM frequency domain signals processed in FD error path processing block 4, there is no wrap and add processing as done in symbol wrap add circuit 42. Consequently, the filter effect by FIR filter 56 on adjacent symbols is included in the filtering and the weighting. A fractional delay, in fractional delay circuit 58, is then added to the weighted error signal to produce the output signal $E_{nmT}$. The weighted error signal sample points following the factional delay are now substantially lined up with the input signals $S_{(n-1)m(T)}$ sample points, as in the FD error path processing block 4.

Referring again to FIG. 1, according to an example embodiment, a total of N iteration processing stages are applied to each of the carriers in the up to M different frequency domain carrier processing blocks 20, for the frequency domain signals, and a total of N iteration processing stages are applied to each of the carriers in the up to M different time domain carrier processing blocks 48. Following the last of the N iteration processing stages in frequency domain carrier processing block 20, there is equalizer 10. Equalizer 10 assists with peak power reduction by emphasizing different portions of the error signal to compensate for the roll-off that occurs in channel filter 14 that follows. According to exemplary embodiments, the guard band sub-carriers are located in the transition region in the frequency domain of channel filter 14 that is used to contain the spectrum that is located before the digital-to-analog converter, just prior to being input to the power amplifier in the transmitter. It is necessary to filter the signal to handle out-of-band spectrum caused by the OFDM symbols boundaries when formulating the time domain signal for OFDM technology.

According to an exemplary embodiment, in order for peak power reduction to work properly, the frequency domain transfer function of the components (filters, up-converters, power amplifiers) after the last iteration processing block must be substantially flat. Therefore, equalizer 10 changes the amplitude of the portion of the spectrum where the guard bands are located, because the signal out of the last iteration process block contains energy in the guard band area. That is, the gain of the equalizer is one in the main signal band, and the inverse of channel filter 14 roll-off in the guard band. In order to achieve the flatness in the error signal response for each carrier processing block 20, a pre-emphasis is added to that portion of the carrier that contains the guard band frequencies where clipped energy are allowed that will later be reduced by the roll-off filtering effects discussed above. The frequency components in the guard band area where the clipped energy is allowed to fall are therefore multiplied by specified scaling factors that are the inverse of the channel filter roll-off.

For example, in a 10 MHz OFDM LTE communications systems, there are 600 in-band signal frequency domain sub-carrier components (i.e., 600 separate sub-carriers and 1 dc component). Twelve additional guard band sub-carriers can be used according to an exemplary embodiment for PPR at each end of the in-band signal spectrum, for a total of 24 guard band sub-carriers. The guard band sub-carriers are normally not used for data transmissions. Usually, therefore, these will have a 0 weight applied to them in the frequency domain filtering. But, if those weights are set to 1 (or at least significantly larger than the weight values in the signal area), then the clipped energy can go to those frequency components, and it will be substantially prevented from entering into the signal area. According to exemplary embodiments, 12 sub-carriers on each end of an OFDM LTE signal equals about 0.18 MHz of signal bandwidth at each end, and this can be used and still meet all emission requirements with an appropriate channel filter. In an example, it has been shown that with approximately 4% of the spectrum in the guard band, significant PPR can be achieved while still meeting the required emission mask and with substantially little or no affect upon signal EVM.

The frequency domain signal output of the last stage is $S_{Nm}$. The number of N iteration processing stages is related to the targeted peak to average ratio, EVM, as well as interpolation factors described above. The purpose of equalizer 10 is to compensate the guard band sub-carrier error signal from the roll-off effect of subsequent filtering. The requirements of subsequent filtering are more stringent due to the energy in the guard band sub-carriers, which require a steep roll-off that will be compensated in the error-signal processing by the pre-emphasis of the equalizer.

The equalized frequency domain signal $S_{Nm}$ is converted to the time domain with standard processing, including iFFT and cyclic prefix (CP) addition performed in iFFT block 12. The signal from iFFT block 12 is then windowed and channel filtered, by, for example, finite impulse response (FIR) block 14 to meet the required emission mask. The outputs from each of frequency domain carrier processing blocks 20, as well as time domain carrier processing blocks 48, are input to a time domain (TD) PPR block 16. Low sample rate peak power reduction is an exemplary embodiment of the processing that occurs within TD PPR block 16.

TD PPR block 16 handles the small transition area between symbols to reduce the PAPR in this region as much as possible while minimizing distortion. As discussed above, about 3% of the OFDM signals, as well as similar portion of the time domain carriers, can possible contain peaks that have not been processed by the circuitry shown in frequency domain carrier processing block 20 and time domain carrier processing block 48. The area of the signals that TD PPR block 16 handles is known as the symbol transition region, as shown in FIG. 5. The output of TD PPR block 16 is the final combined peak power reduced signal $S_p$, which is again in the time domain. A detailed discussion of the operation of TD PPR block 16 is not necessary in order to understand the various exemplary embodiments of the present invention described herein; however, the contents of co-pending U.S. patent application Ser. No. 13/125,625, "Low Sample Rate Peak Power Reduction (LPPR)", to Neil McGowan et al., U.S. Published Patent Application No. U.S. 2012/0064848A1 which does describe operation of TD PPR block in its entirety, is hereby incorporated in its entirety be reference. Referring now to FIG. 10, there is shown a flow diagram of method 1100 for implementing a multi-carrier/technology peak power reduction (MPPR) system according to an exemplary embodiment. Method 1100, as discussed below, could be shown with several steps that indicate a "looping" function, or operation of an iterative procedure. Since those of ordinary skill in the art can appreciate that all of the functions discussed above could literally be performed in one digital signal processing device, such "looping" functions are necessary in order to achieve all of the iterations of error path processing as discussed. However, it is also possible, according to an exemplary embodiment, that each of the functional blocks as shown in the figures, and as discussed above, can be a separate physical entity, and as such the iterative, looping steps that could have been written into method 1100 do not actually exists as in steps of a software routine, but merely indicate that a next set of circuitry performs substantially similar operations as an immediately preceding set of circuitry. As those of ordinary skill in the art can appreciate, all of the frequency domain and time domain carrier signals are output from some prior circuitry substantially simultaneously in a massive parallel data bus, to MPPR system 100, and therefore are substantially simultaneously received and processed by the components of MPPR system 100, as discussed above. The flow diagram, therefore, of the method of operation, is but a convenient means of conveying how MPPR system 100 operates.

Method 1100 according to an exemplary embodiment begins with step 1104, wherein the frequency and time domain input signals $S_{nmF}$ and $S_{nmT}$ are received by MPPR system 100, at either FD carrier processing block 20 or TD carrier processing block 48. Then, in decision step 1106, it is determined whether the received signal is a frequency domain OFDM type signal $S_{nmF}$, or a time domain carrier signal $S_{nmT}$. As those of ordinary skill in the art can appreciate, there is actually no decision making step; instead, frequency domain signals are received in frequency domain carrier processing block 20, and time domain signals are received in time domain carrier processing block 48. Decision making step 1106 merely illustrates that the two signal process paths, frequency domain and time domain, operate in parallel, and substantially simultaneously. If the input signal is a frequency domain OFDM signal, $S_{nmF}$ ("FD" path from decision step 1106), method 1100 proceeds to step 1108, wherein the signal $S_{nmF}$, which comprises a plurality of OFDM sub-carrier and optionally sub-carrier guard band signals, is received in a frequency domain representation in a plurality of frequency domain (FD) carrier processing blocks 20, there being preferably a one-to-one relationship between each FD carrier processing block 20 and a first plurality of sub-carrier signals, $S_{nmF}$. As those of ordinary skill in the art can appreciate, for each FD carrier processing block 20, there is a group of sub-carrier signals $S_{nmF}$, commonly referred to as being part of, or associated with a "carrier." The received signal in each FD carrier processing block 20 is initially received in FD error path processing block 4 that is part of FD iteration processing block $8_{nm}$. According to a preferred exemplary embodiment of MPPR system 100 in a communications systems that uses OFDM type signals, there can be one FD carrier processing block 20 for each carrier, up to m such carriers, and each carrier can include up to 600 data carrying sub-carriers, up to 60 sub-carrier guard bands and 364 out-of-band sub-carriers. Each FD carrier processing block 20 includes, preferably, N equal iterative processing stages, wherein each iterative processing stage includes FD iteration processing block 8, and clipper block 18.

In step 1110, a "$n^{th}$" Δ phase slope amount is added to the input signal $S_{nmF}$ in the $n^{th}$ iterative error path processing block 4. As discussed above, each iteration of processing that occurs in each FD iteration processing block 8 adds another changeable amount of phase slope, or "Δ amount of phase slope" that has the effect of shifting the received input signal $S_{nmF}$ in time, so that the peaks between the original sample points become available or visible, thereby increasing the effectiveness of MPPR system 100. As previously discussed, there are N iterative stages, such that n=1 . . . N. In step 1112, the received frequency domain signal, with the added phase slope, is converted to a time domain signal (in iFFT circuit 26), and in the next step, step 1114, the now time domain signal of the received frequency domain signal has added to it a cyclic prefix (in CP adder 40). Following step 1114, in optional step 1115, a rate change is added to the now time domain signal. The purpose of the optional rate change is to make sure that the rate in the frequency domain signal is substantially equal to the rate in the time domain signal, $S_{nmT}$. Through use of optional RC circuit 38, the K number of time domain components created by iFFT circuit 26 can be increased by a factor R. In the most general case, R can be any value, e.g., 25/8=3.125. By way of another example, R=2, 4, 8, 16, 32, . . . , (i.e., the factor R can be set equal to $2^n$, wherein n=1, 2, 3, 4, 5, and so on). Following either step 1114 or optional step 1115 is step 1116, wherein the time domain signal (original frequency domain signal $S_{nmF}$) is shifted in frequency by first NCO 28 and output to the $m^{th}$ clipper iteration block 18 in step 1118.

Returning to decision step 1106, if the received signal is a time domain signal, $S_{nmT}$, then following the "TD" path from decision step 1106, method 1100 proceeds to step 1120, wherein the time domain input signals, $S_{nmT}$ are processed in TD error path processing block 52 at substantially the same time as the frequency domain input signals $S_{nmF}$.

The time domain carrier signals, used by a different technology for data transmission (it should be understood, by those of ordinary skill in the art, that "data carrying" refers to not only data in the true sense of the word (such as numbers), but also includes voice, video, audio, and any other types and modes of information/content that can be represented digitally), is received by TD carrier processing blocks 48, there being preferably a one-to-one relationship between each TD carrier processing block 48 and a carrier signal, $S_{nmT}$. The received signal in each TD carrier processing block 48 is initially received in TD error path processing block 52 that is part of TD iteration processing block 50$_{nm}$. According to a preferred exemplary embodiment of MPPR system 100 in a communications system, there can be one TD carrier processing block 48 for each carrier, and up to M such carriers. Each TD carrier processing block 48 includes, preferably, N equal iterative processing stages, wherein each iterative processing stage includes a TD iteration processing block 50, and clipper block 18, the same clipper block 18 being shared with the time domain error path processing block 52 of TD iteration processing block 50, for each iterative stage of processing. As discussed in greater detail above, the time domain technologies such as WCDMA, GSM, CDMA, among others, are still used by consumers, and therefore need to be supported and transmitted along with the frequency domain type signals, such as OFDM.

Method 1100 then proceeds to step 1122, wherein the received time domain signals are input to RC circuit 38 that is within TD error path processing block 52 and a change in the sampling rate occurs. The purpose of changing the sampling rate is, as discussed in greater detail above, to increase the number of samples. Following step 1122, step 1124 adds a fractional delay to the received TD signal $S_{nmT}$, such that further interpolation can occur to determine to an even greater extent substantially all of the peak values. In step 1126, a frequency shift of $+f_m$ is applied to the time domain signal such that it is shifted in frequency by NCO 28 and output to the $m^{th}$ clipper iteration block 18 in step 1128.

Steps 1104-1118, for frequency domain carrier signals, occur for each of the up to M FD carrier processing blocks 20 in FD iteration processing blocks 8, and steps 1104-1128, for time domain carrier signals, occur for each of the up to M TD carrier processing blocks 48 in TD iteration processing blocks 52 substantially simultaneously. In step 1130, all of the frequency shifted time domain signals output from FD iteration processing blocks 8 and TD iteration processing blocks 52 are combined in clipper block 18 and summer circuit 44 (as shown in FIGS. 1 and 4). Of course, as those of ordinary skill in the art can appreciate, "substantially simultaneously" means something different in the digital domain than in the analog domain. In the analog domain, signals are literally summed together at or very close to the speed of light, as that is as fast as electrical signals progress through circuit runs, the only delay coming from the analog circuitry, which is typically measured, according to the particular technology being used, in picoseconds or nanoseconds. With digital domain signals however, processing times, especially when summing signals that may constitute 16, 32 or even more bits, and can number in the hundreds, can take more than a few picoseconds or nanoseconds. However, delays associated with summing so many digital signals can be accurately tracked and accounted for, and thus normally do not affect the outcome. Thus, it is not improper to speak of the actions occurring substantially simultaneously.

Figure 10A:
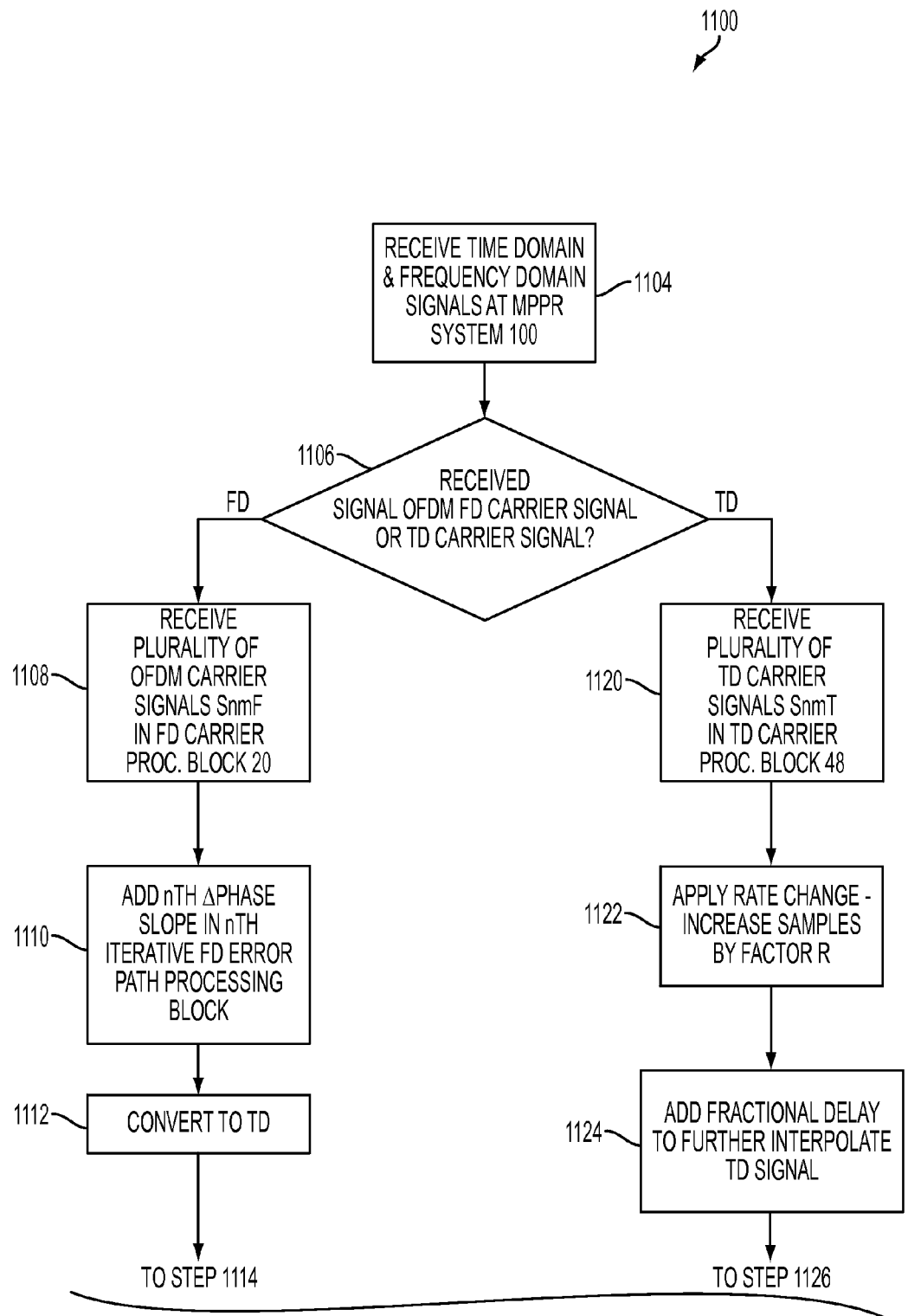
FIG. 10 illustrates a flow diagram of a method of reducing peak power transmissions for both the time and frequency domain according to an exemplary embodiment.
Figure 10B:
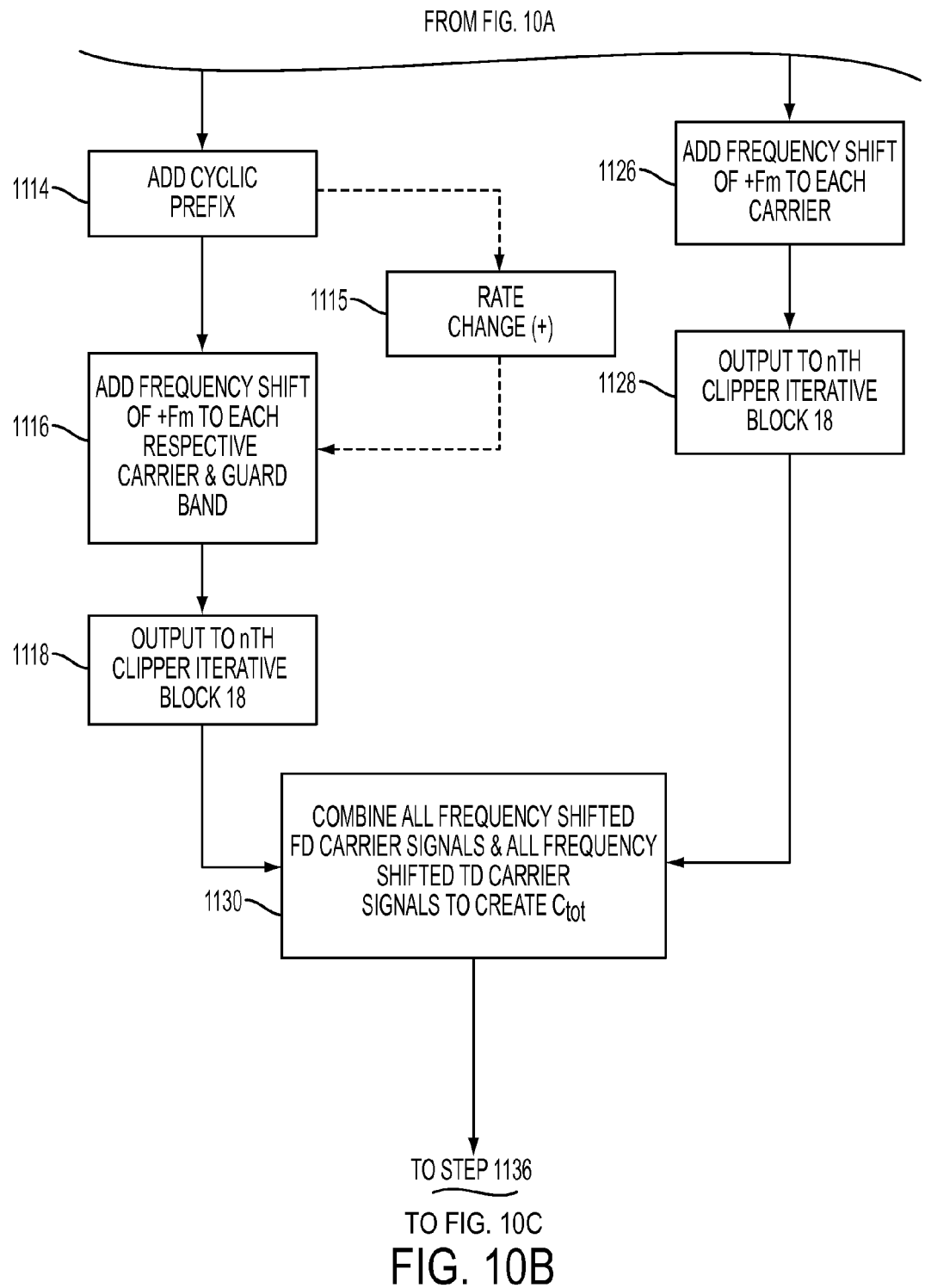
Figure 10C:
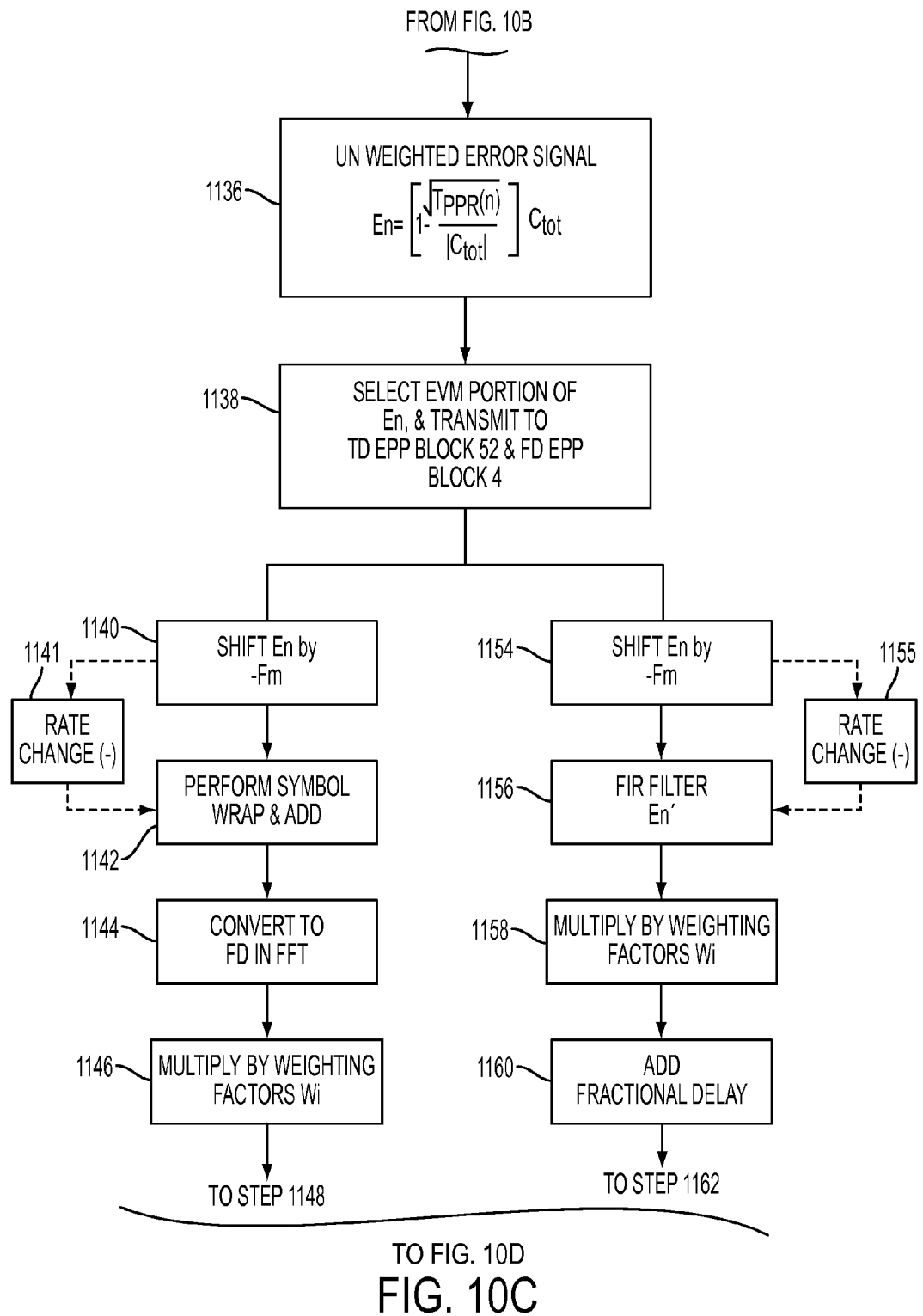
Figure 10D:
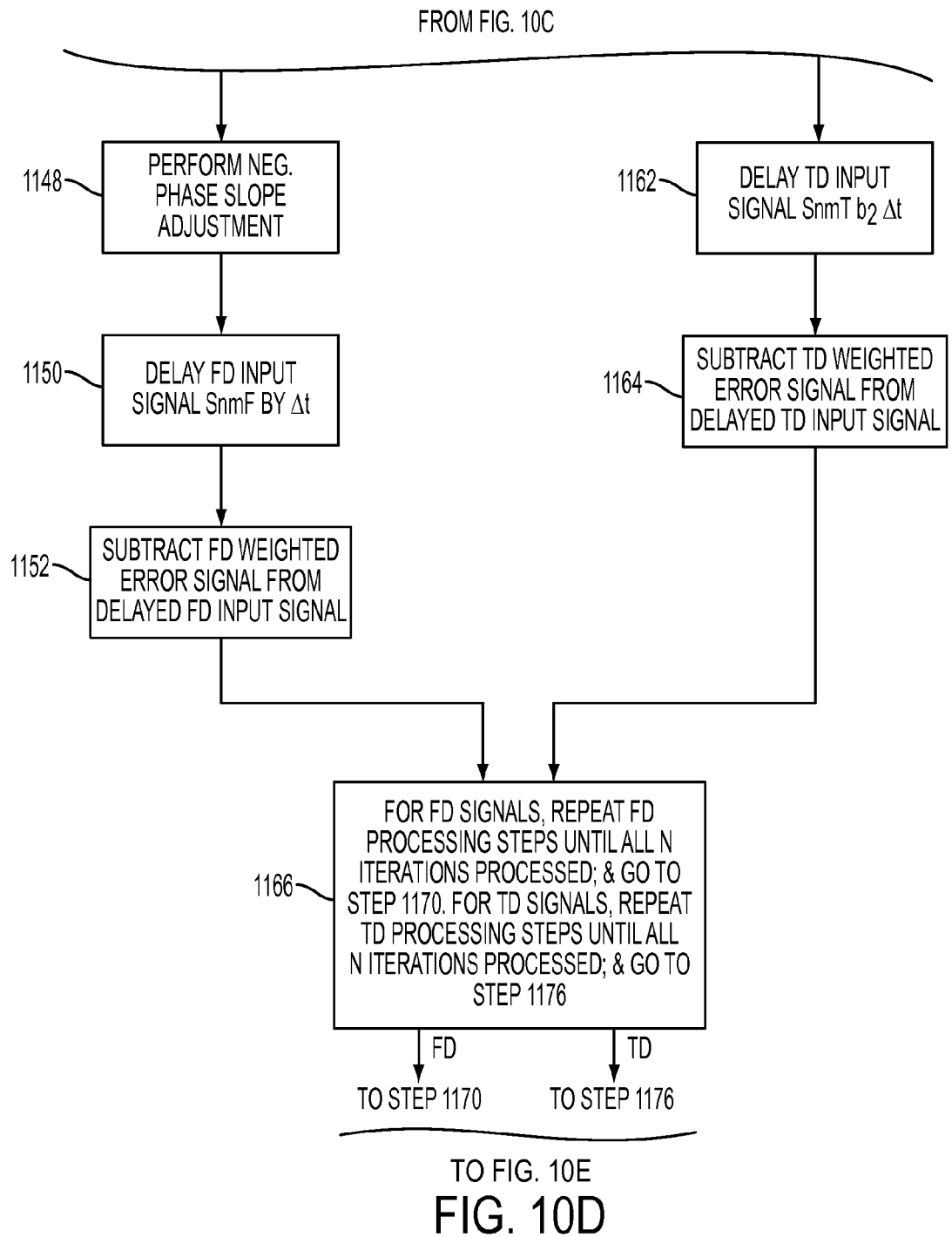
Figure 10E:
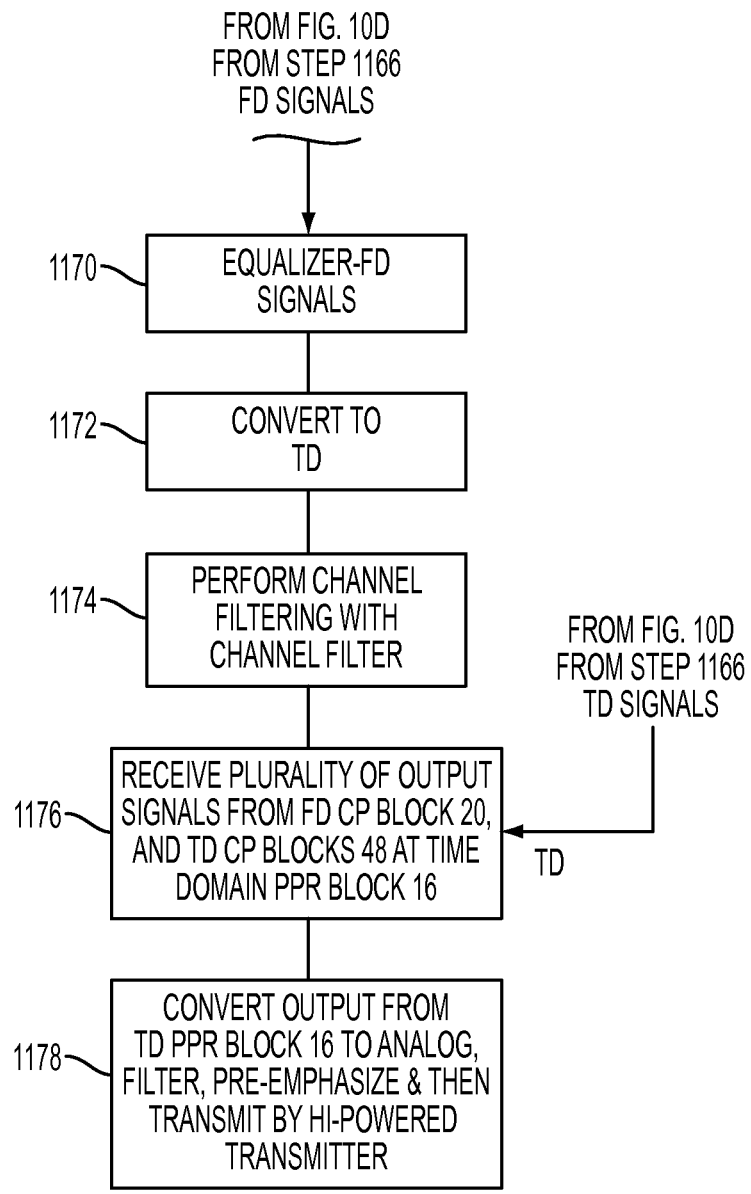

The output of summer circuit 44 is the time domain total signal $C_{tot}$. In step 1136, the power of $C_{tot}$ is compared to a peak power threshold value, in clip error circuit 46, and $E_n$ is generated according to equation 3, as shown in FIG. 10C. In step 1136, the error signal $E_n$ is determined for each sample of $C_{tot}$ by comparing the power of each sample to the peak threshold. As those of ordinary skill in the art can appreciate, $C_{tot}$ and $E_n$ are an array of data for each OFDM symbol, wherein each array contains, according to an exemplary embodiment, 1024 points. In different embodiments, with different sizes of FFT and iFFT circuits (though the FFT and iFFT need to be the same size), the size of the arrays can be different, for example, 2048 points, or 512 points, among other different sizes. As further discussed below for each stage of iteration n, all 1024 input samples must be processed to get 1024 $C_{tot}$ samples and from which 1024 $E_n$ samples are determined. Thus, for each iteration n, in step 1138, 1024 samples of $E_n$ are forwarded from clipper block 18 to each error path processing block 4 in iteration processing block 8 in each frequency domain carrier processing block 20, as well as to each time domain iteration processing block 50 in each time domain carrier processing block 48.

In step 1138, the EVM portion of the error signal is selected (in select EVM portion circuit 60), and the un-weighted error signal $E_n$ is then returned to both TD error path processing block 52 and FD error path processing path 4.

Following step 1138, method 1100 again splits into two, parallel, substantially simultaneous processes, showing that the frequency domain carrier signals and the time domain carrier signals are being processed substantially simultaneously. Step 1140 begins the processing for the frequency domain OFDM type signals, and step 1154 begins the processing for the time domain type signals (e.g., GSM, among others), to show that split, parallel-operated paths process the frequency domain signals and time domain signals substantially in parallel.

Following step 1138, in FD error path processing block 4, the un-weighted error signal $E_n$ is first received by NCO 30 and a frequency shift of $-f_m$ is applied in step 1140 to move back the un-weighted error signal $E'_n$ to its original baseband frequency location, opposite to that which occurred in step 1116. Following step 1140, optional step 1141 then performs a rate change R' that is the inverse of the rate change R that was created in optional step 1115. Then, in step 1142 a symbol wrap and add is performed (in symbol wrap add circuit 42) on the un-weighted error signal $E'_n$. In step 1144, the un-weighted error signal $E'_n$ is converted back to the frequency domain in FFT circuit 32, and in step 1146, the now frequency domain un-weighted error signal $E'_n$ is multiplied by appropriate weighting factors as discussed in greater detail above. $W_i$ is applied to each frequency component to control the amount of clipped energy to fall on the particular sub-carrier. In step 1148, a negative phase slope, a–"$n^{th}$" $\Delta$ phase slope amount, is added to the now-weighted error signal to counteract the positive phase slope that was added previously in step 1110. The output from negative phase slope circuit 36 (and FD error path processing block 4) is $E_{nmF}$, which is then input to adder 6. In step 1150, the input signal, $S_{nmF}$, is delayed by an amount $\Delta t$ that equals all of the processing (i.e., the processing that leads to the creation of weighted error signal $E_{nmF}$) since the received input signal $S_{nmF}$ was received by FD carrier processing block 20. Then, in step 1152, the output from FD error path processing block 4 $E_{nmF}$ is subtracted from the time delayed signal $S_{nmF}$ in adder 6, which is the output of FD iteration processing block 8, and this is input into the next FD iteration processing block 8.

As discussed above, following step 1138, the un-weighted error signal $E_n$ is sent to both FD error path processing block 4 and TD error path processing block 52. Steps 1154-1164 represent the time domain processing of the un-weighted error signal $E_n$. In step 1154 the un-weighted error signal $E_n$ is frequency shifted by $-f_m$ to offset the positive frequency shift of $+f_m$ previously done (in step 1126) and moves it back to its original baseband frequency location. Following step 1154, optional step 1155 then performs a rate change R' that is the inverse of the rate change R that was created in step 1122. In step 1156, the un-weighted error signal $E_n$ is filtered by FIR filter 56. In step 1158, appropriate weighting factors are applied to the error signal (to control the amount of clipped energy that will fall on the particular carrier), and in step 1160, a fractional delay is added to the now weighted error signal $E'$, in order to re-align the samples with the un-processed input time domain signal $S_{nmT}$. An additional purpose to step 1160 is to counteract the interpolating effect of circuit 54 and step 1124.

In step 1162, the received input time domain carrier signal, $S_{nmT}$, is delayed by an amount $\Delta t$ that equals all of the processing since the input carrier signal $S_{nmT}$ was received by TD carrier processing block 48. Then, in step 1164, the output from TD error path processing block 4 $E_{nmT}$ is subtracted from the time delayed signal $S_{nmT}$, which is the output of TD iteration processing block 50, and this is input into the next TD iteration processing block 50.

The output from frequency domain iteration processing block 8 is the $n^{th}$ iterative frequency domain peak power reduced input signal, and the output from time domain iteration processing block 50 is the $n^{th}$ iterative time domain peak power reduced input signal. According to an exemplary embodiment, in some cases, the output signal will not be any different from the input signal, in that $E_{nmF}$ and/or $E_{nmT}$ is equal to 0. According to an exemplary embodiment, the occurrence of $E_{nmF}$ and/or $E_{nmT}$ being equal to zero is considered to be a rare, though not impossible event. That being the case, FIG. 10 simply shows that the steps are performed linearly, one after another, but it is to be understood by those of ordinary skill in the art that after step 1152, which occurs for a frequency domain iteration, steps 1106-1130, 1136-1138, and 1140-1152 are repeated as shown in step 1166, one time for each iteration, until the final iteration n=N occurs. And, after step 1164, which occurs for a time domain iteration, steps 1106, 1120-1130, 1136-1138, and 1154-1164 are repeated as shown in step 1166, one time for each iteration, until the final iteration n=N occurs.

Even when the error signal is equal to zero, because the probability of such an event being so low, MPPR system 100 according to an exemplary embodiment processes $E_{nmF}$ in frequency domain error path processing blocks 4 and $E_{nmT}$ in time domain error path processing blocks 52. According to an alternative exemplary embodiment, MPPR system 100 can bypass processing within the frequency and time domain error path processing blocks 4 and 52 when the error signal is equal to zero. According to exemplary embodiments, the omission of processing can be achieved by hardware, software, or a combination of both hardware and software.

In the next frequency domain iterative processing stage, i.e., in the "$(n+1)^{th}$" frequency domain iteration processing block 8, the phase slope increment is changed, to obtain a peak in a different location on the input signal, and the process continually repeats itself, until all N processing stages have been completed. Similarly, in the next iterative time domain iterative processing stage, i.e., in the "$(n+1)^{th}$" time domain iteration processing block 50, the fractional delay within fractional delay circuit 54 is slightly incremented, to obtain a peak in a different location on the input signal, and the process continually repeats itself, until all N processing stages have been completed.

Method 1100 proceeds from step 1166 to step 1170 for frequency domain signals, and step 1176 for time domain signals. In step 1170, equalizer 10 applies a pre-emphasis to the guard-band sub-carriers used for peak-to-average power reduction to compensate for attenuation in different filters and other signal processing so that the error signal response (for the frequency domain OFDM signals) has a substantially flat frequency transfer function. Then, in step 1172, the frequency domain $S_{nmF}$ is converted to the time domain in iFFT and CP added in circuit 12, which is followed by channel filtering in step 1174. In step 1176 (which is the next step for time domain signals following step 1166, as discussed above), all of the now time domain OFDM carrier signals that have been processed by the n stages of FD carrier processing blocks 20 as well as the time domain carrier signals that have been processed by the n stages of TD carrier processing blocks 48 are input into the TD PPR block 16. According to an exemplary embodiment, as discussed above, TD PPR block 16 handles the area around the transition region in the carrier signals, that is, the "3%" region, which was not previously handled in select EVM circuit 60 (and step 1138) to further process the carrier signals to improve the peak-to-average power ratio.

TD PPR 16 operates on the entire signal to reduce the peaks using time domain clipping and filtering; however, since the peaks not in the transition region have already been taken care of, this second stage of processing takes care of the samples that are in the transition region. The samples in the transition region were zeroed at the output of clipper block 18 in the first stage so they were not reduced in the first stage; the main reason for not performing this earlier according to further exemplary embodiments is that the portion of the signal in the transition region for the OFDM carriers is affected by the changes in the symbol region in blocks 20 and by the windowing and filtering at the end of blocks 20 so the signal in the transition region is only really fully formed after the first stage is complete. Finally, in step 1178, the combined digital carrier signals are then output to a digital-to-analog converter, the output of which might be subject to more filtering prior to being amplified, modulated on carrier signals, and then transmitted by a high power transmitter according to an exemplary embodiment.

MPPR system 100 allows for a lower cost, and less complex signal processing apparatus due to the fact that the signal is represented by a smaller number of samples (even below Nyquist) and due to the fact that all signal processing is done in the error path for both signals represented in the frequency domain (such as OFDM) and the time domain (such as GSM) in parallel. Further, according to exemplary embodiments, the processing of the frequency domain and time domain carrier signals is iteratively performed substantially simultaneously. The result from the error path processing is a joint error signal that is applied in parallel, and iteratively, to each of the frequency domain carrier processing blocks 20 and time domain carrier processing blocks 48. Other terms which could alternatively be used to characterize the joint nature of the processing used to generate the joint error signal are "concurrent", "synchronous" or "contemporaneous". The fractional delay to achieve the ultra-low sample rate processing can be done with a phase slope in the frequency domain without any additional FFT/iFFTs. For the single sub-carrier case, the sub-carrier can be split into sub-bands to lower even further the sample rate for MPPR.

According to a further exemplary embodiment, MPPR significantly improves the performance of PPR by using some of the otherwise unused spectrum in the guard band which has no impact on system throughput. Still further according to an exemplary embodiment, MPPR provides greater flexibility in choosing to target higher output power transmissions while still meeting already established PAPR and emission requirements when existing EVM requirements are less stringent, and can adapt to EVM requirement variations across the sub-carriers of a carrier and across multiple carriers of both frequency domain and time domain signals. MPPR handles multi-carrier PPR efficiently including the handling of large carrier spacing.

According to an exemplary embodiment, implementation of method 1100, discussed in reference to FIG. 10, can occur in a dedicated processor (not shown in any of the FIGS.), or through the various functional blocks shown in FIGS. 1-4. Those of ordinary skill in the art in the field of the invention can appreciate that such functionality can be designed into various types of circuitry, including, but not limited to field programmable gate array structures (FPGAs), application specific integrated circuitry (ASICs), microprocessor based systems, among other types. A detailed discussion of the various types of physical circuit implementations does not substantively aid in an understanding of the invention, and as such has been omitted for the dual purposes of brevity and clarity. However, as well known to those of ordinary skill in the art, the systems and methods discussed herein can be implemented as discussed, and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or nonvolatile memory such as read only memory (ROM) and/or random access memory (RAM). A basic input/output system (BIOS), containing the basic routines that help to transfer information between elements connected to and between the processor, such as during startup, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/nonvolatile computer storage media. For example, the processor can access a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

The present invention can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to, when implemented in suitable electronic hardware, accomplish or support exercising certain elements of the appended claims can be readily construed by programmers skilled in the art to which the present invention pertains.

The above-described exemplary embodiments are intended to be illustrative in all respects, rather than restrictive, of the present invention. Thus the present invention is capable of many variations in detailed implementation that can be derived from the description contained herein by a person skilled in the art. No element, act, or instruction used in the description of the present application should be construed as critical or essential to the invention unless explicitly described as such. Also, as used herein, the article "a" is intended to include one or more items.

We claim:

1. A system for peak power reduction on a plurality of frequency domain orthogonal frequency divisional multiplexing (OFDM) signal carriers and a plurality of time domain signal carriers in a communications system, comprising;

a plurality of frequency domain carrier processing blocks configured to iteratively perform frequency domain processing of at least one frequency domain OFDM signal carrier to reduce peak power transmission; and a plurality of time domain carrier processing blocks configured to iteratively perform time domain processing of at least one time domain signal carrier to reduce peak power transmission, wherein the system is further configured to perform the frequency domain processing and time domain processing substantially simultaneously, thereby spreading excess peak power to one or more of the plurality of frequency domain OFDM signal carriers and to one or more of the plurality of time domain signal carriers.

2. The system according to claim 1, wherein the at least one OFDM signal carrier includes both in-band sub-carrier signals, and guard-band sub-carrier signals.

3. The system according to claim 1, wherein the system is further configured to generate a joint error signal based on a substantial simultaneous processing of the at least one frequency domain OFDM signal carrier and at least one time domain signal carrier.

4. The system according to claim 3, wherein the joint error signal is further applied substantially synchronously to each of the frequency domain and time domain carrier processing blocks on an iterative basis, and wherein the joint error signal, upon application to the frequency domain and time domain carrier processing blocks, has applied to it a respective plurality of frequency dependent weights to reduce peak power transmissions.

5. The system according to claim 1, further comprising:

a plurality of frequency domain iteration processing blocks, wherein each of the plurality of the frequency domain carrier processing blocks includes at least one of the plurality of frequency domain iteration processing blocks, and wherein a first frequency domain iteration processing block is configured to receive a respective one of the plurality of frequency domain OFDM signal carriers, and generate a first time domain OFDM error path processing block frequency shifted signal ($C_{nmF}$), receive a first iterative time domain un-weighted error signal ($E_n$), and output a first iterative frequency domain peak power reduced OFDM carrier signal ($S_{nmF}$), and wherein each of the remaining n−1 frequency domain iteration processing blocks are configured to receive an $(n-1)^{th}$ iterative frequency domain peak power reduced OFDM carrier signal carrier, output an $n^{th}$ time domain OFDM error path processing block frequency shifted signal, receive an $n^{th}$ iterative un-weighted error signal, and generate an $n^{th}$ iterative frequency domain peak power reduced OFDM signal carrier; and a plurality of time domain iteration processing blocks, wherein each of the plurality of the time domain carrier processing blocks includes at least one of the plurality of time domain iteration processing blocks, and wherein a first time domain iteration processing block is configured to receive a respective one of the plurality of time domain signal carriers, and generate a first time domain error path processing block frequency shifted signal ($C_{nmT}$), receive the first iterative time domain un-weighted error signal ($E_n$), and output a first iterative time domain peak power reduced signal carrier ($S_{nmT}$), and wherein each of the remaining n−1 time domain iteration processing blocks are configured to receive an $(n-1)^{th}$ iterative time domain peak power reduced signal carrier, output an $n^{th}$ time domain error path processing block frequency shifted signal, receive an $n^{th}$ iterative un-weighted error signal, and generate an $n^{th}$ iterative time domain peak power reduced signal carrier.

6. The system according to claim 5, further comprising:

a plurality of frequency domain OFDM signal processing blocks, there being a respective one of the plurality of frequency domain OFDM signal processing blocks for each of the respective plurality of frequency domain carrier processing blocks, and wherein each of the plurality of frequency domain OFDM signal processing blocks is configured to receive an $n^{th}$ iterative frequency domain peak power reduced OFDM signal carrier and output a time domain, filtered, peak power reduced OFDM signal carrier;

a time domain peak power reduced block configured to receive the plurality of time domain, filtered, peak power reduced OFDM signal carriers and the plurality of time domain peak power reduced signal carriers, further process all of the received signals, and output a combined peak power reduced signal carrier; and a high powered transmitter to transmit the combined peak power reduced signal carrier following conversion from a digital time domain signal to an analog signal.

7. The system according to claim 6, wherein each of the plurality of OFDM signal processing blocks comprises:

an equalizer configured to boost in amplitude sub-carrier guard band signals within the $n^{th}$ iterative frequency domain peak power reduced input signal;

an inverse Fast Fourier Transform circuit configured to convert the equalized $n^{th}$ iterative frequency domain peak power reduced input signal to an equalized $n^{th}$ iterative time domain peak power reduced input signal; and a filter configured to substantially reduce or eliminate unwanted frequency components from the equalized $n^{th}$ iterative time domain peak power reduced input signal to output time domain, filtered, peak power reduced OFDM signals.

8. The system according to claim 1, wherein each of the plurality of frequency domain carrier processing blocks comprises:

a plurality of frequency domain error path processing blocks, and wherein each of the plurality of frequency domain error path processing blocks include— a phase slope circuit configured to add a determinable phase slope to the received frequency domain OFDM signal carrier in the frequency domain;

an inverse Fast Fourier Transform circuit configured to convert the phase shifted frequency domain OFDM signal carrier to the time domain, wherein due to the added determinable phase slope, a plurality of sampling points will be shifted by a first fractional time amount;

a cyclic prefix adder for adding a first predetermined prefix to a first symbol of the frequency domain OFDM signal carrier; and a first numerically controlled oscillator configured to shift the time domain version of the frequency domain OFDM signal carrier by a first predetermined frequency amount, and outputting an iterative time domain OFDM error path processing block frequency shifted signal.

9. The system according to claim 8, wherein for each iteration of processing, the fractional time amount shift causes additional peak values of the iterative time domain OFDM error path processing block frequency shifted signal to be output by the frequency domain error path processing block.

10. The system according to claim 8, further comprising:
a rate change increase circuit after the cyclic prefix adder circuit and before first numerically controlled oscillator, wherein the rate change increase circuit includes a predetermined rate change value R and is configured to generate M time domain sampling points, wherein M equals R times K, wherein K corresponds to the number of sample points of the time domain received frequency domain OFDM signal carrier.

11. The system according to claim 8, wherein each of the plurality of time domain carrier processing blocks comprises:
a plurality of time domain error path processing blocks, and wherein each of the plurality of time domain error path processing blocks include—
  a rate change increase circuit configured to increase the number of samples of the received time domain signal carrier by a factor R;
  a fractional delay interpolator circuit configured to shift each of a plurality of sampling points of the received time domain signal carrier by a first time amount, wherein the first time amount is related to the iteration of processing within the time domain carrier processing block; and
  a second numerically controlled oscillator configured to shift the time domain signal carrier by a second predetermined frequency amount ($+f_m$) and outputting an iterative time domain error path processing block frequency shifted signal.

12. The system according to claim 11, wherein for each iteration of processing, the time amount shift causes additional peak values of the iterative time domain error path processing block frequency shifted signal to be output by the time domain error path processing block.

13. The system according to claim 11, further comprising:
a combiner configured to combine a plurality of $n^{th}$ iterative time domain OFDM error path processing block frequency shifted signals and a plurality of $n^{th}$ iterative time domain error path processing block frequency shifted signals to generate an $n^{th}$ iterative total combined signal $C_{tot}$; and
a clip error circuit configured to compare the $n^{th}$ iterative total combined signal to a peak power threshold signal $T_{PPR}$ and generate an $n^{th}$ iterative un-weighted error signal $E_n$ on a symbol-by-symbol basis, wherein the $n^{th}$ iterative un-weighted error signal value either has a zero value when the $n^{th}$ iterative total combined signal is less than the peak power threshold signal, and further wherein the $n^{th}$ iterative un-weighted error signal has a non-zero value when the $n^{th}$ iterative total combined signal is greater than the peak power threshold signal.

14. The system according to claim 13, wherein the non-zero value of the $n^{th}$ iterative un-weighted error signal is equal to the amount that the $n^{th}$ iterative total combined signal exceeds the peak power threshold signal.

15. The system according to claim 13, wherein the $n^{th}$ iterative un-weighted error signal is determined according to the equation of:

$$E_n = \left[1 - \frac{\sqrt{T_{PPR}(n)}}{|C_{tot}|}\right] C_{tot}.$$

16. The system according to claim 13, wherein the clip error circuit is further configured to, on an iterative basis, compare the $n^{th}$ iterative total combined signal to a first peak threshold amount at a respective one of each of the plurality of shifted sampling points to generate the $n^{th}$ iterative un-weighted error signal.

17. The system according to claim 13, further comprising:
a select error vector magnitude portion circuit configured to delete a prefix portion of the $n^{th}$ iterative un-weighted error signal that is omitted from error vector magnitude calculations in transmitted signal carriers in the communications system.

18. The system according to claim 13, wherein the frequency domain error path processing block further comprises:
a third numerically controlled oscillator configured to receive the $n^{th}$ iterative un-weighted error signal and shift it by a third predetermined frequency amount substantially equivalent to an inverse of the first predetermined frequency amount;
a symbol wrap-add circuit configured to copy a prefix portion of the frequency shifted $n^{th}$ iterative un-weighted error signal and add the prefix portion to an end portion of the frequency shifted $n^{th}$ iterative un-weighted error signal;
a Fast Fourier Transform circuit configured to convert the frequency shifted $n^{th}$ un-weighted iterative error signal to a frequency domain iterative un-weighted error signal;
a multiplier circuit configured to multiply the frequency domain iterative un-weighted error signal by a plurality of weighting factors to generate a frequency domain iterative weighted error signal;
an inverse phase slope circuit configured to subtract a second determinable phase slope substantially equal to in magnitude to the first determinable phase slope from the iterative weighted error signal; and wherein
the time domain error path processing block further comprises:
a fourth numerically controlled oscillator configured to receive the $n^{th}$ iterative un-weighted error signal and shift it by a fourth predetermined frequency amount substantially equivalent to an inverse of the second predetermined frequency amount;
a filter configured to filter unwanted frequency components from the $n^{th}$ iterative un-weighted error signal;
a multiplier circuit configured to multiply the $n^{th}$ iterative un-weighted error signal by a plurality of weighting factors to generate an iterative weighted error signal; and an inverse fractional delay circuit configured to inversely shift each of a plurality of sampling points of the received iterative weighted error signal by a second time amount, wherein the second time amount is substantially equal to the first shift time amount.

19. The system according to claim 18, further comprising:
a first plurality of delay circuits, one for each of the plurality of frequency domain carrier processing blocks, configured to receive a respective one of the plurality of frequency domain OFDM signal carriers and delay it by a first delta time;
a first plurality of multiplier circuits, one for each of the plurality of frequency domain carrier processing blocks, configured to multiply the delayed frequency domain OFDM signal carrier and the weighted iterative error signal to generate the $n^{th}$ iterative frequency domain peak power reduced OFDM signal carrier, whereby excess peak power can be distributed to one or more guard-band sub-carriers of the OFDM signal carrier, and/or one or more in-band sub-carriers of the OFDM signal carrier;
a second plurality of delay circuits, one for each of the plurality of time domain carrier processing blocks, configured to receive a respective one of the plurality of time domain signal carriers and delay it by a second delta time;
a second plurality of multiplier circuits, one for each of the plurality of time domain carrier processing blocks, configured to multiply the delayed time domain signal carrier and the weighted iterative error signal to generate the $n^{th}$ iterative time peak power reduced signal carrier, whereby excess peak power can be distributed to one or more of the time domain signal carriers.

20. The system according to claim 19, wherein
the first delta time is substantially equivalent to a sum of the processing time in phase slope increase circuit, inverse Fast Fourier Transform circuit, cyclic prefix added circuit, second numerically controlled oscillator, combiner, clip error circuit, select error vector magnitude portion circuit, third numerically controlled oscillator, symbol wrap added circuit, Fast Fourier Transform circuit, multiplier, and negative phase slope circuit, and further wherein
the second delta time is substantially equivalent to a sum of the processing time in positive rate change circuit, fractional delay circuit, second numerically controlled oscillator, combiner, clip error circuit, select error vector magnitude portion circuit, fourth numerically controlled oscillator, filter, and multiplier.

21. The system according to claim 19, wherein
the $n^{th}$ iterative frequency domain peak power reduced OFDM carrier is input to an $(n+1)^{th}$ frequency domain error path processing block, and an $n=(n+1)^{th}$ iterative frequency domain peak power reduction OFDM signal carrier is generated; and further wherein
the $n^{th}$ iterative time domain peak power reduced signal carrier is input to an (n+1)th time domain error path processing block, and an $n=(n+1)^{th}$ iterative time domain peak power reduction signal carrier is generated.

22. The system according to claim 18, wherein the weighting factor is determined according to the equation of:

$$W_i = \frac{\sigma B_T w_i}{\sum_{i=0}^{K-1} B_{w_i}}$$

where $B_T$ is the total bandwidth; $B_{w_i}$ is the spectral density of each weight component $w_i$;

$w_i$ is a weight value that controls the amount of clipped energy that will fall on the frequency component i, K is the size of a Fast Fourier Transform (FFT) process, and σ is a re-growth factor, wherein the re-growth factor controls the overall distortion of the received error signal and is a function of the number of iterations.

23. The system according to claim 22, wherein the weighting factor is determined according to a tolerance for distortion for each frequency domain OFDM signal carrier and each time domain signal carrier.

24. The system according to claim 23, wherein the tolerance for distortion is characterized by an error vector magnitude for each frequency domain OFDM signal carrier and each time domain signal carrier.

25. The system according to claim 8, wherein the number of iteration stages is dependent upon the frequency band of the carrier processing block and the amount of determinable phase slope that is added in each subsequent first error path processing step.

26. A method for peak power reduction on a plurality of frequency domain orthogonal frequency divisional multiplexing (OFDM) carrier signals and a plurality of time domain carrier signals in a communications system, comprising:
iteratively performing, substantially simultaneously, a frequency domain modification of each of the plurality of frequency domain OFDM carrier signals to reduce peak power transmissions, and a time domain modification of each of the plurality of time domain carrier signals to reduce peak power transmissions, thereby spreading excess peak power to one or more of the plurality of frequency domain OFDM carrier signals and to one or more of the plurality of time domain carrier signals.

27. The method according to claim 26, wherein the at least one OFDM signal carrier includes both in-band sub-carrier signals, and guard-band sub-carrier signals.

28. The method according to claim 26, further comprising:
generating a joint error signal based on a substantial simultaneous processing of the at least one frequency domain OFDM signal carrier and at least one time domain signal carrier.

29. The method according to claim 28, wherein the joint error signal is further applied substantially synchronously to each of a frequency domain carrier processing block and a time domain carrier processing block on an iterative basis, and wherein the joint error signal, upon application to the frequency domain and time domain carrier processing blocks, has applied to it a respective plurality of frequency dependent weights to reduce peak power transmissions.

30. The method according to claim 26, wherein the step of iteratively performing peak power reduction for both frequency domain OFDM carrier signals and time domain carrier signals comprises:
(a) receiving the plurality of frequency domain OFDM carrier signals in a $n^{th}$ frequency domain error processing block in a respective one of a plurality of frequency domain carrier processing blocks;
(b) generating a frequency domain OFDM frequency shifted signal for each of the plurality of frequency domain OFDM carrier signals;
(c) receiving the plurality of time domain carrier signals in a $n^{th}$ time domain error processing block in a respective one of a plurality of time domain carrier processing blocks;
(d) generating a time domain frequency shifted signal for each of the plurality of time domain carrier signals;
(e) summing all of the frequency domain frequency shifted signals and all of the time domain frequency shifted signals into a total power signal;

(f) generating an un-weighted error signal representative of excess peak power ($E_n$), wherein the un-weighted error signal is proportional to an amount that the total power signal exceeds a peak power threshold amount;

(g) applying a frequency dependent weighting factor ($W_i$) to the error signal to generate a frequency dependent weighted error signal;

(h) subtracting the frequency dependent weighted error signal from each of the plurality of frequency domain OFDM carrier signals and time domain carrier signals, to reduce peak power in selected one or more of the OFDM carrier signals and selected one or more of the time domain carrier signals, and to increase peak power in selected one or more of the OFDM carrier signals and selected one or more of the time domain carrier signals; and (i) repeating steps (a) through (h) until N iterative stages have been performed to produce a plurality of $N^{th}$ iterative frequency domain OFDM carrier signals with excess peak power spread among a plurality of data carrying sub-carrier OFDM signals and guard band sub-carriers of the plurality of $N^{th}$ iterative frequency domain OFDM carrier signals to reduce peak power, and to further produce a plurality of $N^{th}$ iterative time domain carrier signals with excess peak power spread among the plurality of $N^{th}$ iterative time domain carrier signals to reduce peak power.

* * * * *